(12) United States Patent
Vijayaraghavan et al.

(10) Patent No.: US 8,788,862 B1
(45) Date of Patent: Jul. 22, 2014

(54) METHOD AND SYSTEM FOR EFFICIENTLY TRANSITIONING A COMMUNICATION CIRCUIT FROM A LOW-POWER STATE

(75) Inventors: Divya Vijayaraghavan, Los Altos, CA (US); Chong H. Lee, San Ramon, CA (US)

(73) Assignee: Altera Corporation, San Jose, CA (US)

( * ) Notice: Subject to any disclaimer, the term of this patent is extended or adjusted under 35 U.S.C. 154(b) by 296 days.

(21) Appl. No.: 13/175,745

(22) Filed: Jul. 1, 2011

(51) Int. Cl.
*G06F 1/32* (2006.01)

(52) U.S. Cl.
USPC .......................................... 713/323; 713/300

(58) Field of Classification Search
USPC ................................................ 713/323, 300
See application file for complete search history.

(56) References Cited

U.S. PATENT DOCUMENTS

| | | |
|---|---|---|
| 6,778,599 B1 | 8/2004 | Doron |
| 8,108,756 B2 | 1/2012 | Ganga et al. |
| 8,230,240 B2 * | 7/2012 | Diab et al. ..................... 713/300 |
| 8,451,869 B1 * | 5/2013 | Lo ................................. 370/537 |
| 2003/0206564 A1 | 11/2003 | Mills et al. |
| 2004/0246128 A1 * | 12/2004 | Menard .................... 340/539.19 |
| 2009/0259713 A1 * | 10/2009 | Blumrich et al. ............. 709/201 |
| 2009/0296567 A1 | 12/2009 | Yasrebi et al. |
| 2010/0020860 A1 | 1/2010 | Dai et al. |
| 2010/0046543 A1 | 2/2010 | Parnaby |
| 2010/0257391 A1 | 10/2010 | Dring et al. |
| 2010/0319037 A1 * | 12/2010 | Kim et al. ........................ 725/81 |
| 2013/0034132 A1 * | 2/2013 | Kaneko et al. ................ 375/219 |

* cited by examiner

*Primary Examiner* — Vincent Tran

(57) ABSTRACT

A method and system for efficiently transitioning a communication circuit from a low-power state are disclosed. A first device and second device in a low-power state may be transitioned to an active state to enable the transmission of data over a communication link, where energy consumption of one or more components of the first and/or second devices may be reduced in the low-power state. The transition may be initiated by the first device responsive to a signal and/or an expiration of a timer. Responsive thereto, a scrambler of the first device may be temporarily bypassed to accelerate achieving block lock at the second device, thereby enabling the system to more quickly transition from the low-power state to the active state.

22 Claims, 17 Drawing Sheets

METHOD AND SYSTEM FOR EFFICIENTLY
TRANSITIONING A COMMUNICATION
CIRCUIT FROM A LOW-POWER STATE

RELATED APPLICATIONS

The present application is related to U.S. patent application Ser. No. 13/175,749, filed Jul. 1, 2011, entitled "METHOD AND SYSTEM FOR REFRESHING A COMMUNICATION CIRCUIT DURING A LOW-POWER STATE," naming Divya Vijayaraghavan and Chong Lee as inventors. That application is incorporated herein by reference in its entirety and for all purposes.

The present application is related to U.S. patent application Ser. No. 13/175,740, filed Jul. 1, 2011, entitled "METHOD AND SYSTEM FOR TRANSITIONING A COMMUNICATION CIRCUIT TO A LOW-POWER STATE," naming Divya Vijayaraghavan and Chong Lee as inventors. That application is incorporated herein by reference in its entirety and for all purposes.

BACKGROUND OF THE INVENTION

Ethernet networks are commonly used to exchange data. For example, computer systems may be coupled via Ethernet links, where the links may include twisted-pair cabling or some other communication medium. As another example, Ethernet links may be implemented in the backplane of a system that includes one or more different types of devices such as compute blades, line cards, switch cards, etc. The electronic devices may communicate over one or more Ethernet links within the backplane of the system.

Although Ethernet is a useful way to communicate data, conventional solutions for transmitting and receiving data consume a relatively large amount of energy. For example, circuitry at both the transmitting and receiving ends of the Ethernet consume power regardless of whether data is being transmitted over the Ethernet link or not. Thus, conventional solutions used to implement communication over an Ethernet link are not always energy efficient, and therefore, costly.

Furthermore, in backplane applications where a significant number of devices are housed together in close proximity to one another, the amount of heat generated by the circuitry used to implement communication over the Ethernet link can adversely affect system performance and reliability. For example, the processing power of a compute blade may have to be reduced if core temperatures exceed predetermined values due to a high ambient air temperature inside the system. Additionally, high ambient air temperature caused by the Ethernet circuitry can increase the failure rate of system components.

SUMMARY OF THE INVENTION

Accordingly, a need exists for more energy efficient communication over a communication link, particularly using communication circuitry implemented using one or more programmable logic devices (PLDs) such field-programmable gate arrays (FPGAs). A need also exists to enable communication over a communication link in a more cost-effective manner. Further, a need exists to generate less heat while enabling communication over a communication link. Embodiments of the present invention provide novel solutions to these needs and others as described below.

Embodiments of the present invention are directed to method and system for efficiently transitioning a communication circuit from a low-power state. More specifically, a first device and second device in a low-power state may be transitioned to an active state to enable the transmission of data over a communication link (e.g., an Ethernet link, a link that operates in accordance with another communication standard, etc.), where energy consumption of one or more components of the first and/or second devices may be reduced in the low-power state. The transition may be initiated by the first device (e.g., a programmable logic device such as a field-programmable gate array (FPGA)) responsive to a signal (e.g., associated with data transmission over the communication link) and/or an expiration of a timer (e.g., associated with a period of reduced data transmission over the communication link). Responsive thereto, a scrambler of the first device may be temporarily bypassed to accelerate achieving block lock at the second device, thereby enabling the system to more quickly transition from the low-power state (e.g., where energy consumption of one or more components can be reduced to conserve energy) to the active state (e.g., where data can be transmitted over the communication link).

In one embodiment, a method of efficiently transitioning a communication circuit from a low-power state may include activating a transmitter of a first device responsive to an event. The method may further include transmitting, over a communication link, an alert signal for reception by a second device. A scrambler of the first device may be bypassed to accelerate block lock at the second device. At least one component of the first device may be reactivated to transition from the low-power state to an active state.

In another embodiment, a circuit of a first device may include a first component operable to scramble data to be transmitted over a communication link, wherein the communication link provides a communication path between the first device and a second device. A second component may be operable to bypass the first component to accelerate block lock at the second device, and wherein the second component is further operable to bypass the first component responsive to an event associated with a transition from a low-power state to an active state.

In yet another embodiment, an integrated circuit includes a transmitter operable to communicate with another device over a communication link. A data scrambler is operable to scramble data to be transmitted by the transmitter. A scrambler bypass module is operable to bypass the first component to accelerate block lock at the another device, and wherein the scrambler bypass module is further operable to bypass the data scrambler responsive to an event associated with a transition from a low-power state to an active state.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Embodiments of the Present Invention

Figure 1:
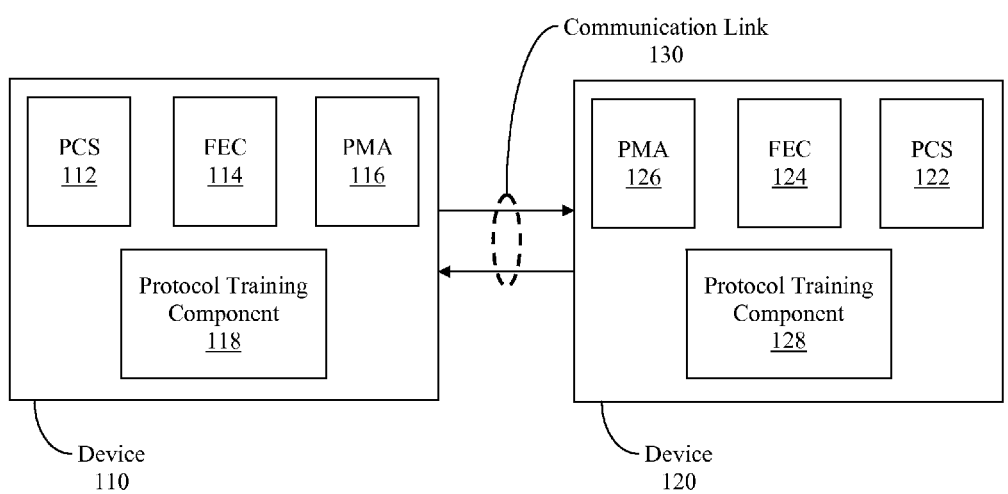
FIG. 1 shows an exemplary system for enabling devices to communicate over a communication link in accordance with one embodiment of the present invention.

FIG. 1 shows exemplary system 100 for enabling devices to communicate over a communication link in accordance with one embodiment of the present invention. As shown in FIG. 1, device 110 and device 120 may communicate over communication link 130. As such, communication link 130 may provide a communication path for one or more devices (e.g., device 110, device 120, etc.). Communication link 130 may be an Ethernet link, a link that operates in accordance with another communication standard (e.g., PCI-Express, USB, eSATA, etc.), etc.

In one embodiment, device 110 and device 120 may perform unidirectional and/or bidirectional communication over link 130 at speeds of up to approximately 10 Gbps or greater in an active state. However, to conserve energy, a low-power state may be implemented where power consumption of one or more components of device 110 and/or device 120 may be reduced (e.g., using power gating, clock gating, etc.). System 100 may be transitioned between the active state and the low-power state in accordance with process 300 of FIG. 3 in one embodiment.

As shown in FIG. 1, device 110 and/or device 120 may include a plurality of components enabling data to sent and/or received over communication link 130. For example, device 110 may include physical coding sublayer (PCS) 112, forward error correction (FEC) sublayer 114, physical medium attachment (PMA) 116 and protocol training component 118. As another example, device 120 may include physical coding sublayer (PCS) 122, forward error correction (FEC) sublayer 124, physical medium attachment (PMA) 126 and protocol training component 128. In one embodiment, device 110 and/or device 120 may be implemented using one or more programmable logic devices (PLDs) such as a field-programmable gate arrays (FPGAs) or the like, where one or more components of device 110 and/or device 120 may be implemented in accordance with PLD 1600 of FIG. 16 in one embodiment. Alternatively, device 110 may be implemented using one or more other types of integrated circuits such as application specific integrated circuits (ASICs), memory integrated circuits, central processing units, microprocessors, analog integrated circuits, some combination thereof, etc.

Figure 2:
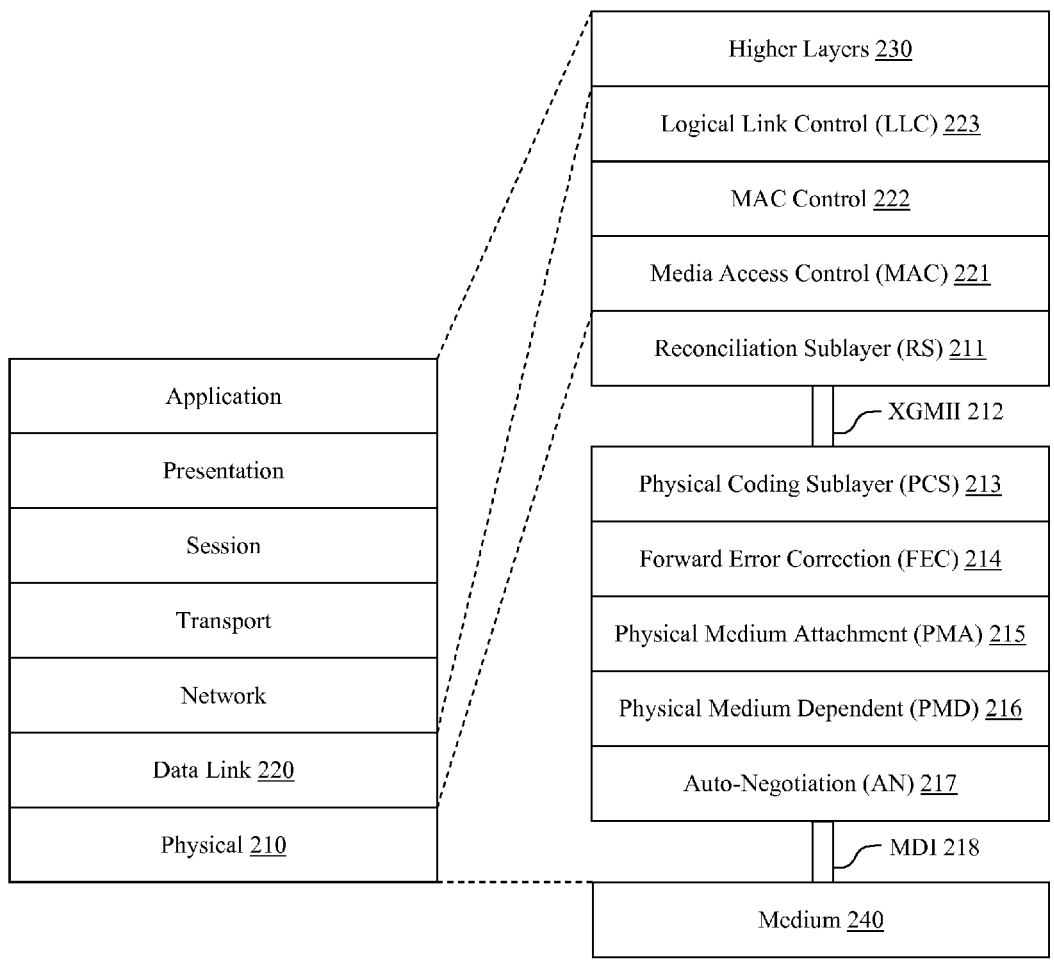
FIG. 2 shows an exemplary interface including a plurality of abstraction layers in accordance with one embodiment of the present invention.

FIG. 2 shows an exemplary interface 200 including a plurality of abstraction layers in accordance with one embodiment of the present invention. In one embodiment, interface 200 may be used to implement or be included in device 110 and/or device 120 of FIG. 1.

As shown in FIG. 2, interface 200 includes one or more physical layers 210, one or more data link layers 220, and one or more higher layers 230. The one or more physical layers may be communicatively coupled to medium 240, where medium 240 may be used to implement communication link 130 in one embodiment.

The one or more physical layers 210 may include reconciliation sublayer (RS) 211, 10 Gigabit media independent interface (XGMII) 212, physical coding sublayer (PCS) 213, forward error correction (FEC) sublayer 214, physical medium attachment (PMA) sublayer 215, physical medium dependent (PMD) sublayer 216, autonegotiation (AN) sublayer 217, medium dependent interface (MDI) 218, some combination thereof, etc. The one or more data link layers 220 may include media access control (MAC) sublayer 221, MAC control sublayer 222, logical link control (LLC) sublayer 223, some combination thereof, etc.

Turning back to FIG. 1, PCS 112 and/or PCS 122 may be implemented in accordance with PCS sublayer 213 in one embodiment. FEC 114 and/or FEC 124 may be implemented in accordance with FEC sublayer 214 in one embodiment. And in one embodiment, PMA 116 and/or PMA 126 may be implemented in accordance with PMA sublayer 215.

In one embodiment, system 100 may be a backplane system. For example, device 110 and/or device 120 may be a device (e.g., a compute blade, line card, switch card, etc.) that plugs into or otherwise couples to the backplane (e.g., a printed circuit board, motherboard, etc.), where communication link 130 is implemented using traces etched in copper of the backplane, circuitry coupled with the backplane, etc. In this manner, system 100 may be operated (e.g., in accordance with process 300 of FIG. 3) to conserve energy in a backplane application, for instance in one embodiment.

Alternatively, device 110 and device 120 may be disposed remotely from one another (e.g., in different rooms of a building or house, across the nation, across the world, etc.). As such, communication link 130 may include twisted-pair cabling or some other medium (e.g., traces on a printed circuit board, pins, fiber optic cables and/or connections, etc.). Accordingly, system 100 may be operated (e.g., in accordance with process 300 of FIG. 3) to conserve energy in a variety of other applications.

Figure 3:
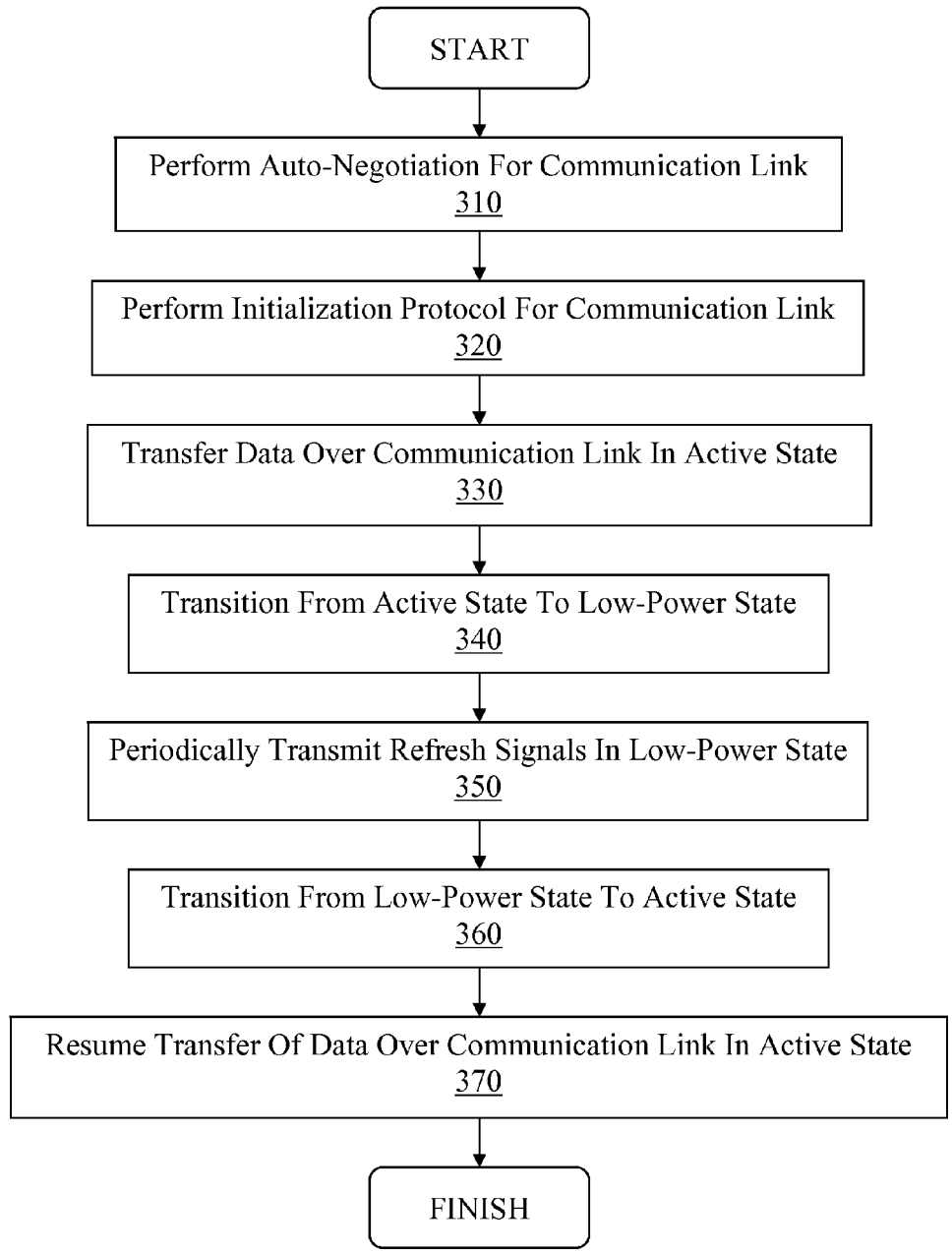
FIG. 3 shows a flowchart of an exemplary process for reducing energy consumption while providing rapid power-up in accordance with one embodiment of the present invention.

FIG. 3 shows a flowchart of exemplary process 300 for reducing energy consumption while providing rapid power-up in accordance with one embodiment of the present invention. FIG. 3 will be described in conjunction with exemplary diagram 400 of FIG. 4 to provide examples and help clarify the discussion.

As shown in FIG. 3, step 310 involves performing auto-negotiation for a communication link (e.g., 130). Auto-negotiation as performed in step 310 may involve communication between devices (e.g., device 110, device 120, etc.) coupled to communication link 130 to decide upon transmission parameters (e.g., speed, duplex mode, flow control, etc.) to be used by each device during an active state (e.g., in step 330, step 370, etc.). Step 310 may also involve determining parameters associated with a low-power state (e.g., entered in step 340 and exited in step 360). In one embodiment, step 310 may be performed using a respective auto-negotiation sublayer (e.g., similar to AN sublayer 217 of FIG. 2) of each device (e.g., device 110 and device 120).

Step 320 of FIG. 3 involves performing an initialization protocol for the communication link (e.g., 130). In one embodiment, a training procedure may be performed in step 320 between devices coupled to communication link 130 to determine one or more coefficients (e.g., one or more transmit equalization coefficients) for each device and/or to synchronize clock signals at the second device (e.g., 120) to clock signals at the first device (e.g., 110). The training procedure may involve sending at least one training frame (e.g., similar to training frame data structure 1200 of FIG. 12) from a first device acting as the master (e.g., device 110) to a second device acting as the slave (e.g., device 120). The coefficients may be communication coefficients such as adaptive filter coefficients (e.g., used by a finite impulse response (FIR) filter or another type of adaptive filter for equalization of communication link 130) in one embodiment. Additionally, the at least one training frame may include training patterns enabling synchronization of a clock signal at the second device (e.g., 120) to a clock signal at the first device (e.g., 110).

As shown in FIG. 3, step 330 involves transferring data over the communication link (e.g., 130) in an active state. For example, step 330 may involve sending data from the first device (e.g., 110) to the second device (e.g., 120). As another example, step 330 may involve sending data from the second device (e.g., 120) to the first device (e.g., 110). In one embodiment, step 330 may involve transferring data between the devices (e.g., 110 and 120) at speeds of up to approximately 10 Gbps or greater in the active state.

Step 340 involves transitioning from the active state to a low-power state (e.g., responsive to some recognized event). Since one or more components of the first device (e.g., 110) and/or the second device (e.g., 120) may consume less energy in the low-power state than the active state, transitioning to the low-power state can save energy (e.g., using power gating, clock gating, etc.) of the communication system.

Figure 4:
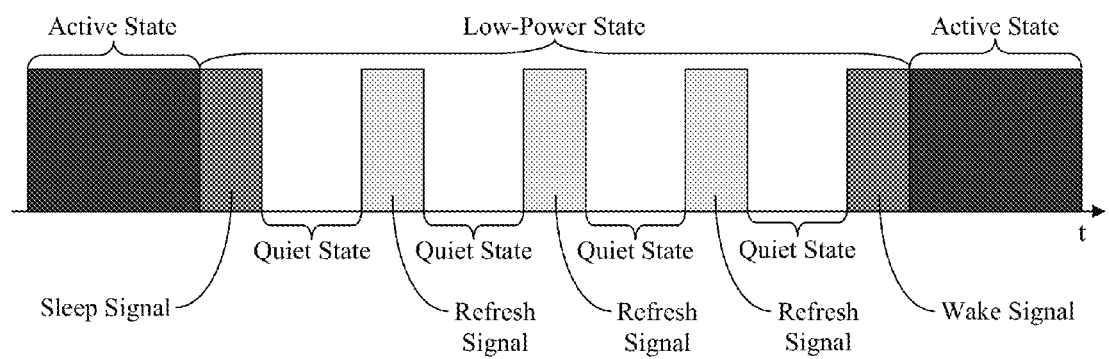
FIG. 4 shows an exemplary diagram for reducing energy consumption while providing rapid power-up in accordance with one embodiment of the present invention.

As shown in FIG. 4, a transition from the active state to the low-power state may be initiated in step 340 by a sleep signal. The sleep signal may be an "assert LPI" signal presented at the XGMII (e.g., similar to XGMII 212 of interface 200 of FIG. 2) of the first device (e.g., 110) in one embodiment. Responsive to detecting the sleep signal at the first device (e.g., 110), a symbol may be encoded in data that is sent from the first device (e.g., 110) to the second device (e.g., 120). Upon receiving and decoding the symbol at the second device (e.g., 120), an "assert LPI" signal may be presented at the XGMII (e.g., similar to XGMII 212 of interface 200 of FIG. 2) of the second device (e.g., 120) in one embodiment. As such, each device may be made aware of the request to enter the low-power state, thereby enabling energy consumption of one or more components of the devices to be reduced in the low-power state. And in one embodiment, step 340 may be performed in accordance with process 600 of FIG. 6.

As shown in FIG. 3, it is appreciated that in accordance with embodiments of the present invention, step 350 involves periodically transmitting refresh signals or communications in the low-power state. The refresh signals transmitted in step 350 may be used to refresh the receiver (e.g., to update adaptive filter coefficients, perform clock synchronization, etc.) while remaining in the low-power state and enable the transition from the low-power state to the active state (e.g., in step 360) to occur more efficiently or quickly (e.g., by avoiding or reducing the re-negotiation of the coefficients). In one embodiment, the transmitter of the first device and the receiver of the second device may be activated before sending each refresh signal and deactivated after sending each refresh signal, thereby enabling energy to be conserved in the low-power state by deactivating components when not in use (e.g., as shown in FIG. 4 by the quiet states before and/or after each refresh signal). In one embodiment, step 350 may be performed in accordance with process 1000 of FIG. 10.

Step 360 involves transitioning from the low-power state to the active state (e.g., responsive to some recognized event). In one embodiment, the transition from the low-power state to the active state may be initiated by a wake signal (e.g., as shown in FIG. 4). The transmitter of the first device (e.g., 110) may be reactivated to send an alert signal to the second device, where the alert signal may initiate a reactivation of the receiver of the second device (e.g., 120). It is appreciated that in accordance with embodiments of the present invention a scrambler of the first device and/or a descrambler of the second device may be bypassed in step 360 to accelerate block lock at the second device (e.g., 120) and further enable the transition from the low-power state to the active state to occur more quickly. Accordingly, one or more components of the first device (e.g., 110) and/or the second device (e.g., 120) may be reactivated to resume normal operation in the active state. And in one embodiment, step 360 may be performed in accordance with process 1300 of FIGS. 13A and 13B.

As shown in FIG. 3, step 370 involves resuming the transfer of data over the communication link (e.g., 130) in the active state. For example, step 370 may involve sending data from the first device (e.g., 110) to the second device (e.g., 120). As another example, step 370 may involve sending data from the second device (e.g., 120) to the first device (e.g., 110). In one embodiment, step 370 may involve transferring data between the devices (e.g., 110 and 120) at speeds of up to approximately 10 Gbps or greater in the active state.

Figure 5:
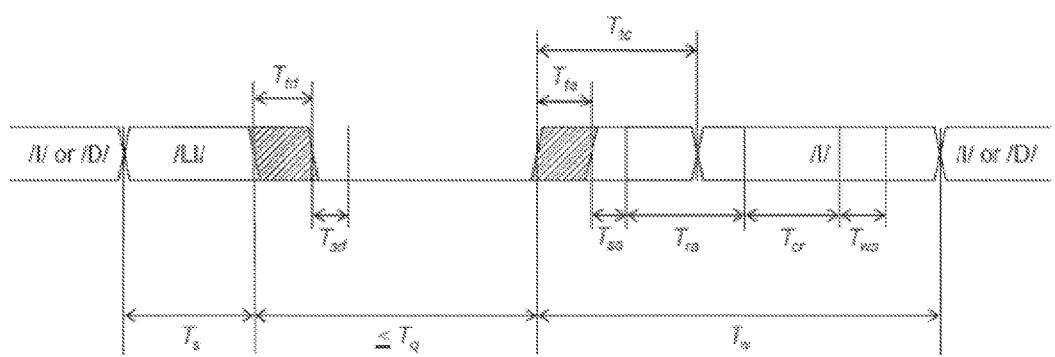
FIG. 5 shows an exemplary detailed timing diagram in accordance with one embodiment of the present invention.

FIG. 5 shows exemplary detailed timing diagram 500 corresponding to diagram 400 of FIG. 4 in accordance with one embodiment of the present invention. As shown in FIG. 5, $T_s$ may be a duration associated with a sleep signal, $T_q$ may be a duration associated with a low-power state (e.g., during which refresh signals or communications are periodically communicated), and $T_w$ may be a duration associated with a wake signal. $T_{td}$ may be a duration associated with a deactivation of a transmitter (e.g., of device 110), $T_{ta}$ may be a duration associated with a partial activation of a transmitter (e.g., of device 110), and $T_{tc}$ may be a duration associated with a full activation of a transmitter (e.g., of device 110). $T_{sd}$ may be a duration associated with a signal_detect de-assertion of a receiver (e.g., of device 120), whereas $T_{sa}$ may be a duration associated with a signal_detect assertion of a receiver (e.g., of device 120). Additionally, $T_{ra}$ may be a duration associated with an activation of a receiver (e.g., of device 120), $T_{cr}$ may be a duration associated with a timing acquisition of a receiver (e.g., of device 120), and $T_{ws}$ may be a duration associated with a synchronization of a PCS (e.g., 122) of a receiver (e.g., of device 120).

Transition To The Low-Power State

Figure 6:
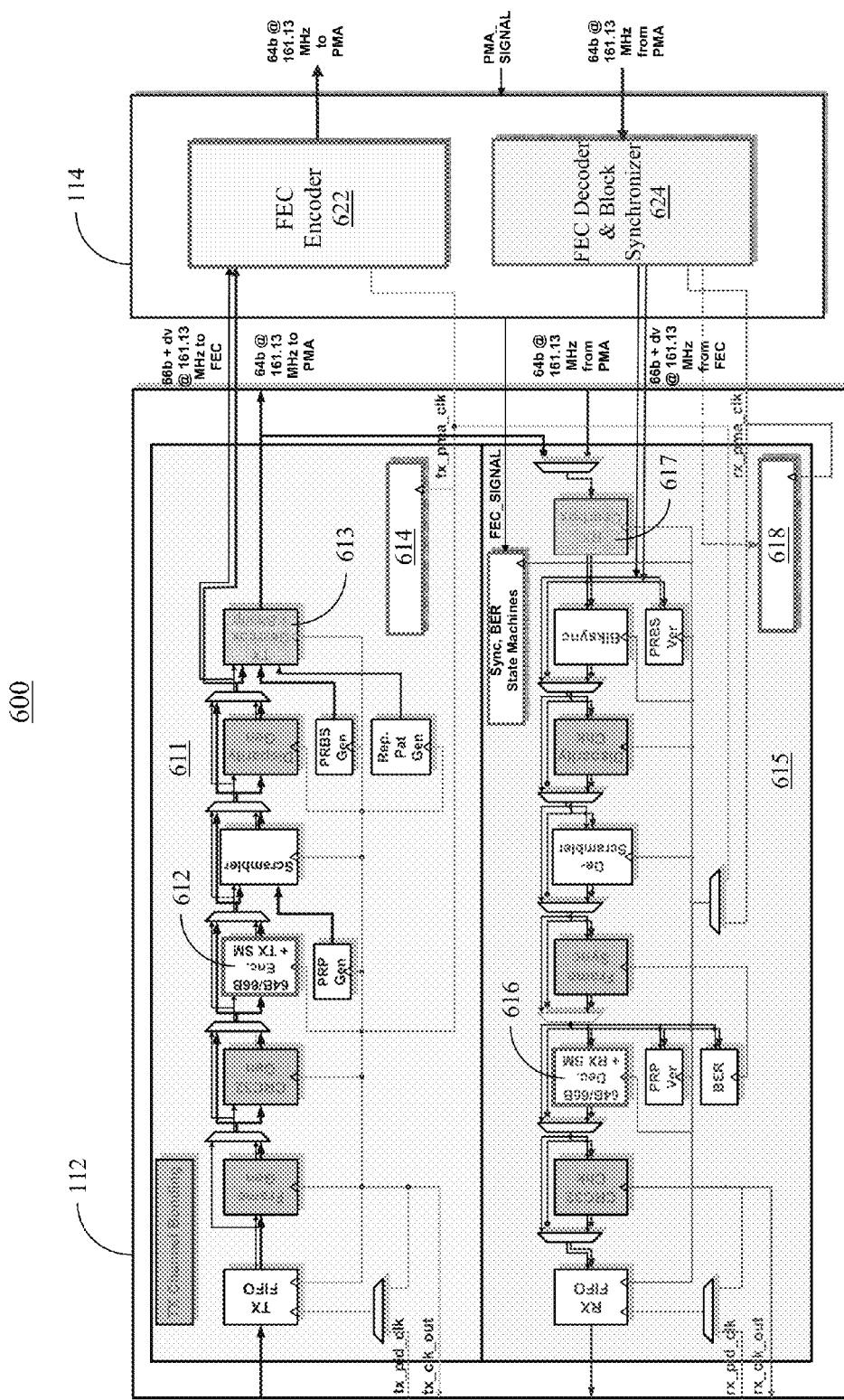
FIG. 6 shows an exemplary system for enabling a transition to a low-power state in accordance with one embodiment of the present invention.

FIG. 6 shows exemplary system 600 for enabling a transition to a low-power state (e.g., responsive to a low-power command or event) in accordance with one embodiment of the present invention. As shown in FIG. 6, transmitter 611 of PCS 112 may be used to transmit data to another device (e.g., second device 120 via FEC Encoder 622) over a communication link (e.g., 130) in an active state, whereas receiver 615 of PCS 112 may be used to receive data transmitted from another device (e.g., second device 120 via FEC Decoder & Block Synchronizer 624) over the communication link (e.g., 130). However, to conserve energy, a first device (e.g., 110) including PCS 112 may initiate a transition from the active state to a low-power state. For example, responsive to accessing a request to transition to the low-power state (e.g., an "assert LPI" signal presented at the XGMII of the first device), encoder 612 may encode a symbol in data to be transmitted (e.g., by or using transmission component 613) to a second device (e.g., 120). The first device may deactivate (e.g., using power gating, clock gating, etc.) one or more components (e.g., of PCS 112, of FEC 114, of PMA 116, etc.). Additionally, responsive to receiving and decoding the symbol, the second device may deactivate (e.g., using power gating, clock gating, etc.) one or more components (e.g., of PCS 122, of FEC 124, of PMA 126, etc.). In this manner, energy consumption of one or more components can be reduced and a low-power state may be entered to conserve energy.

Additionally, power may be conserved by deactivating one or more components of the first device where the transition to the low-power state is initiated by the second device. For example, responsive to receiving (e.g., by or using receiving component 617) data including a symbol at PCS 112, decoder 616 of receiver 615 may decode the symbol from the data. Responsive to determining that the symbol is associated with a request to enter a low-power state (e.g., initiated by the second device), a request to transition to the low-power state (e.g., an "assert LPI" signal) may be presented (e.g., at an XGMII of the first device). The first device may then deactivate (e.g., using power gating, clock gating, etc.) one or more components (e.g., of PCS 112, of FEC 114, of PMA 116, etc.) to conserve energy in the low-power state.

Figure 7:
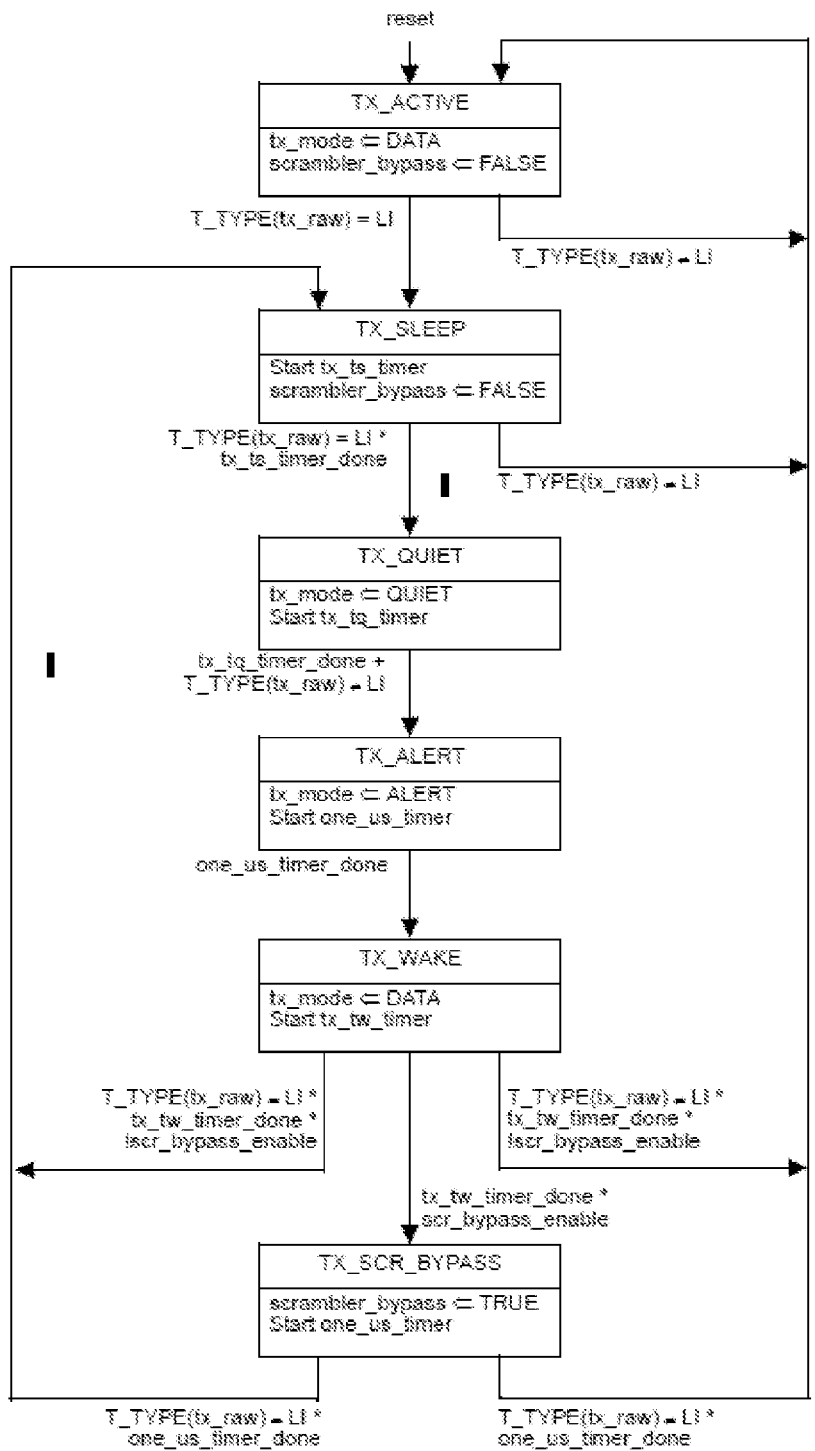
FIG. 7 shows an exemplary state diagram for a transmitter in accordance with one embodiment of the present invention.

As shown in FIG. 6, encoding and/or transmission of the symbol at PCS 112 may be controlled by state machine 614. In one embodiment, state machine 614 may operate in accordance with state diagram 700 depicted in FIG. 7. It should be appreciated that state diagram 700 is exemplary, and thus, may include a different number, ordering, etc. of states in other embodiments.

Figure 8:
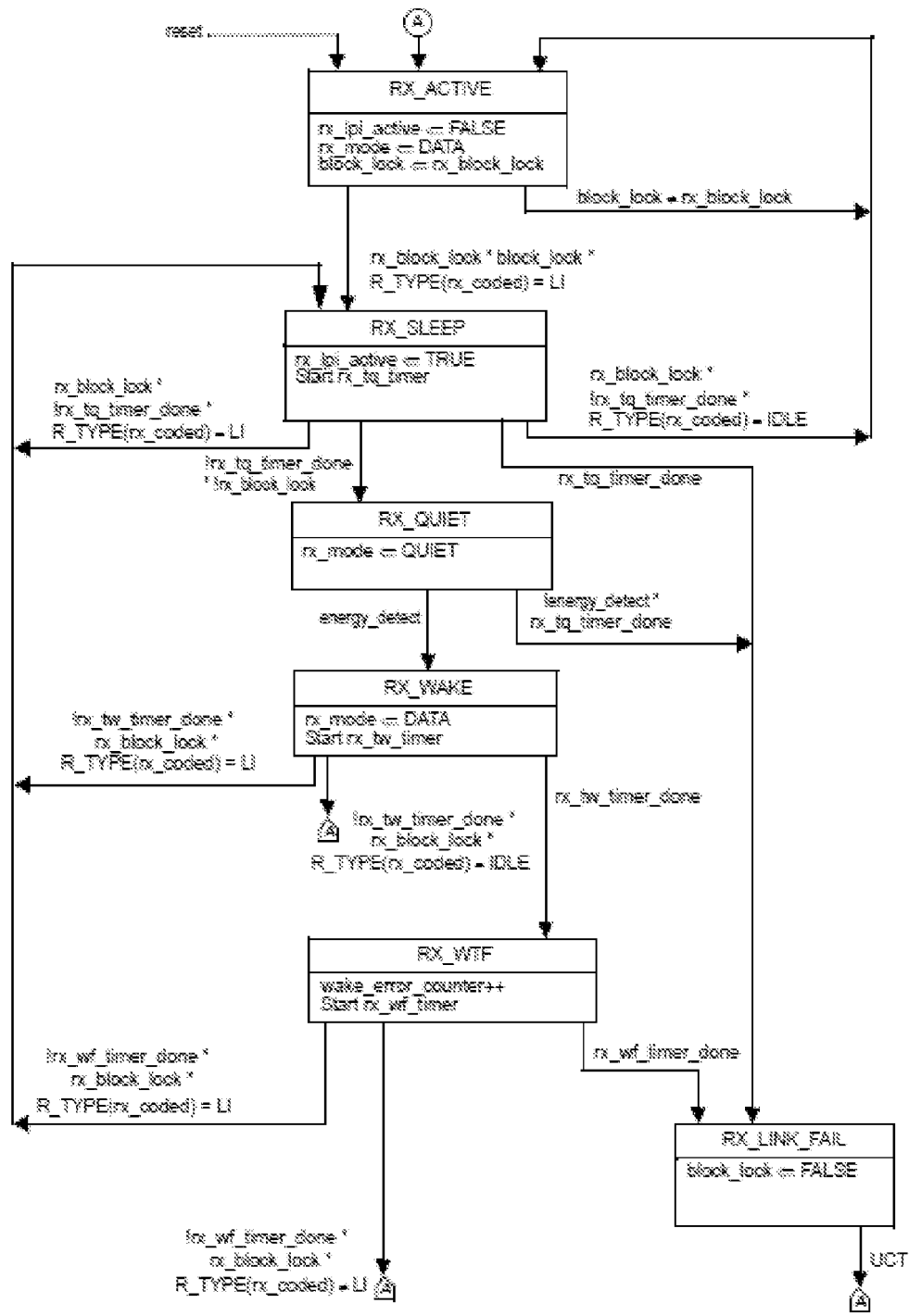
FIG. 8 shows an exemplary state diagram for a transmitter in accordance with one embodiment of the present invention.

Decoding and/or receiving of the symbol at PCS 112 may be controlled by state machine 618. In one embodiment, state machine 618 may operate in accordance with exemplary state diagram 800 depicted in FIG. 8. It should be appreciated that state diagram 800 is exemplary, and thus, may include a different number, ordering, etc. of states in other embodiments.

Turning back to FIG. 6, transmitter 611 of PCS 112 may include various components for processing and/or communicating data as part of an output data path of PCS 112. It should be appreciated that these components of transmitter 611 are well known in the art, and thus, are not described in detail herein. Additionally, receiver 615 of PCS 112 may include various components for processing and/or communicating data as part of an input data path of PCS 112. It should be appreciated that these components of receiver 615 are well known in the art, and thus, are not described in detail herein.

Although FIG. 6 shows a specific number of components, it should be appreciated that system 600 may include a different number of components in other embodiments. Additionally, although FIG. 6 shows a specific arrangement of components, it should be appreciated that system 600 may include a different arrangement of components in other embodiments.

Figure 9:
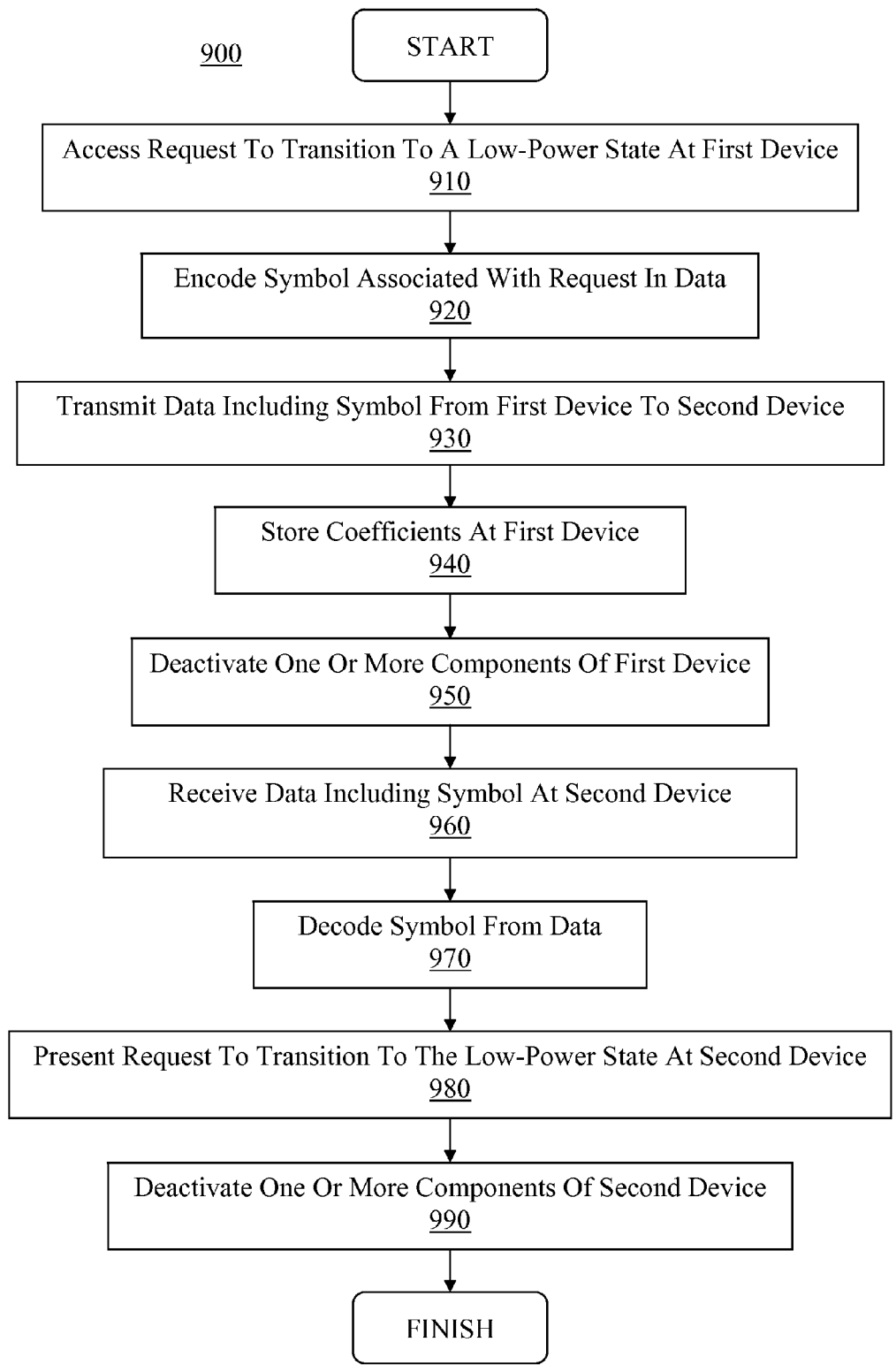
FIG. 9 shows a flowchart of an exemplary process for transitioning from an active state to a low-power state in accordance with one embodiment of the present invention.

FIG. 9 shows a flowchart of exemplary process 900 for transitioning from an active state to a low-power state in accordance with one embodiment of the present invention. As shown in FIG. 9, step 910 involves accessing a request to transition to a low-power state. The request may be a signal (e.g., an "assert LPI" signal) presented at an XGMII (e.g., similar to XGMII 212) of the first device (e.g., 110) in one embodiment. The request may be generated responsive to a determination that no data or a reduced amount of data is to be transferred over a communication link (e.g., 130). In one embodiment, step 910 may be performed by an encoder (e.g., 612) of a transmitter (e.g., 611) of a PCS (e.g., 112).

Step 920 involves encoding a symbol associated with the request (e.g., accessed in step 910) in data. In one embodiment, step 920 may be performed by an encoder (e.g., 612) of a transmitter (e.g., 611) of a PCS (e.g., 112).

As shown in FIG. 9, step 930 involves transmitting the data including the symbol from the first device (e.g., 110) to the second device (e.g., 120). The data including the symbol may be transmitted over a communication link (e.g., 130) in one embodiment. And in one embodiment, step 920 may be performed by a transmission component (e.g., 613) of a transmitter (e.g., 611) of a PCS (e.g., 112).

Step 940 involves storing coefficients at the first device. The coefficients may be communication coefficients such as adaptive filter coefficients (e.g., used by a FIR filter or another type of adaptive filter for equalization of communication link 130) in one embodiment. The coefficients may be stored in a memory of the first device (e.g., 110) in step 940, where the memory may be a non-volatile memory (e.g., capable of retaining the coefficients responsive to deactivation in step 950) in one embodiment.

As shown in FIG. 9, step 950 involves deactivating one or more components of the first device (e.g., 110). For example, step 950 may involve deactivating (e.g., using power gating, clock gating, etc.) PCS 112 or at least one component thereof, FEC 114 or at least one component thereof, PMA 116 or at least one component thereof, protocol training component 118 or at least one component thereof, or some other component of the first device. In this manner, energy consumption of the first device can be reduced in the low-power state.

Step 960 involves receiving data including the symbol at the second device. The data may be received by a component (e.g., similar to receiving component 617 of PCS 112) of a receiver (e.g., similar to receiver 615 of PCS 112) of the second device (e.g., 120).

As shown in FIG. 9, step 970 involves decoding the symbol from the data. The symbol may be decoded by a component (e.g., similar to decoder 616 of PCS 112) of a receiver (e.g., similar to receiver 615 of PCS 112) of the second device (e.g., 120).

Step 980 involves presenting a request to transition to the low-power state at the second device. The request may be a signal (e.g., an "assert LPI" signal) presented at an XGMII (e.g., similar to XGMII 212) of the second device (e.g., 120) in one embodiment.

As shown in FIG. 9, step 990 involves deactivating one or more components of the second device (e.g., 120). For example, step 990 may involve deactivating (e.g., using power gating, clock gating, etc.) PCS 122 or at least one component thereof, FEC 124 or at least one component thereof, PMA 126 or at least one component thereof, protocol training component 128 or at least one component thereof, or some other component of the first device. In this manner, energy consumption of the second device can be reduced in the low-power state.

In one embodiment, one or more steps of process 900 may be controlled by a state machine (e.g., 614, 618, etc.) of the first device (e.g., 110) or a state machine (e.g., similar to state machine 614, state machine 618, etc.) of the second device (e.g., 120). And in one embodiment, one or more steps of process 900 may be controlled by a state machine (e.g., 614, 618, etc.) of the first device (e.g., 110) in conjunction with a state machine (e.g., similar to state machine 614, state machine 618, etc.) of the second device (e.g., 120). Accordingly, one or more state machines may be used to transition one or more devices coupled to a communication link (e.g., 130) from an active state to a low-power state, thereby enabling energy consumption to be reduced (e.g., when no data or a reduced amount of data is to be transferred over the communication link).

In one embodiment, one or more steps and/or operations in process 900 performed at the second device (e.g., 120) may be performed responsive to a request generated at the first device (e.g., 110) and transmitted to the second device for initiating the one or more steps and/or operations. Accordingly, the first device (e.g., 110) may act as the master and the second device (e.g., 120) may act as the slave.

Operations Performed During The Low-Power State

Figure 10:
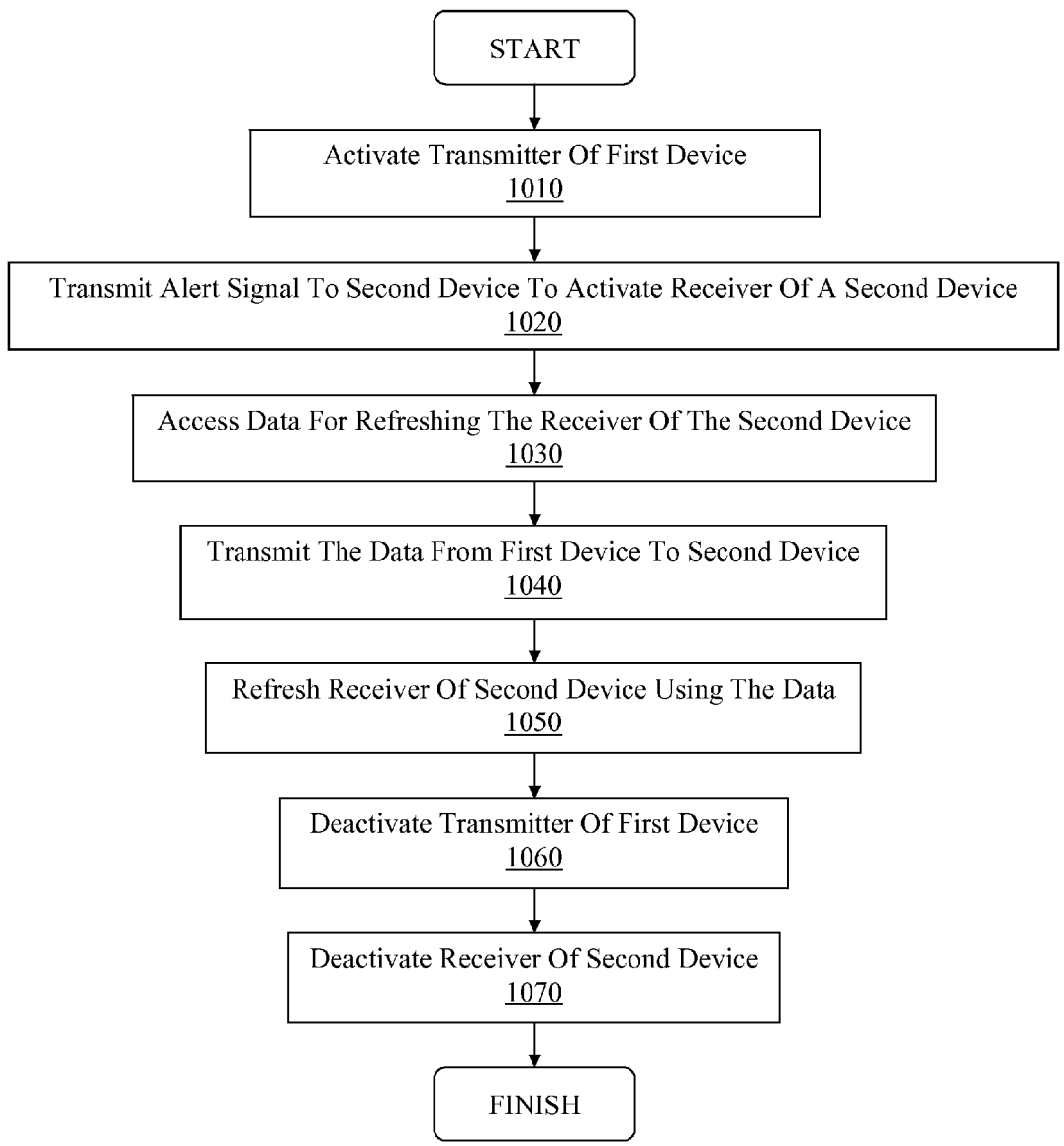
FIG. 10 shows a flowchart of an exemplary process for refreshing a receiver during a low-power state in accordance with one embodiment of the present invention.

FIG. 10 shows a flowchart of exemplary process 1000 for refreshing a receiver during a low-power state (e.g., to provide rapid power-up capability) in accordance with one embodiment of the present invention. FIG. 10 will be described in conjunction with exemplary data flow diagram 1100 of FIG. 11 and exemplary training frame data structure 1200 of FIG. 12 to provide examples and help clarify the discussion.

As shown in FIG. 10, step 1010 involves activating a transmitter of a first device (e.g., 110). In one embodiment, a protocol training component (e.g., 118) of the first device (e.g., 110) may activate the transmitter (e.g., the analog PHY circuitry or some portion thereof) in step 1010, where the transmitter is implemented using one or more components of a PMA (e.g., 116) of the first device (e.g., 110). The transmitter may be activated in step 1010 by providing power to one or more components of the transmitter, by providing a clock signal to one or more components of the transmitter, etc. In this manner, the transmitter may be activated in step 1010 (e.g., to enable signals to be transmitted over communication link 130 in the low-power state) while allowing other components of the first device (e.g., FEC 114, PCS 112, higher device layers, etc.) to remain deactivated to reduce power consumption in the low-power state.

Step 1020 involves transmitting an alert signal (e.g., over communication link 130) to the second device (e.g., 120) to activate a receiver of the second device. The alert signal may be a square wave pattern with a 16 unit interval period in one embodiment. In one embodiment, the receiver may be implemented using one or more components of a PMA (e.g., 126) of the second device (e.g., 120), where the receiver may be activated responsive to a detection of the alert signal by a component (e.g., that remains active during the low-power state and consumes relatively little energy) of the second device (e.g., 120). The receiver may be activated in step 1020 by providing power to one or more components of the transmitter, by providing a clock signal to one or more components of the transmitter, etc. In this manner, the receiver may be activated in step 1020 (e.g., to enable signals to be received over communication link 130 in the low-power state) while enabling other components of the second device (e.g., FEC 124, PCS 122, higher device layers, etc.) to remain deactivated to reduce power consumption in the low-power state.

Figure 11:
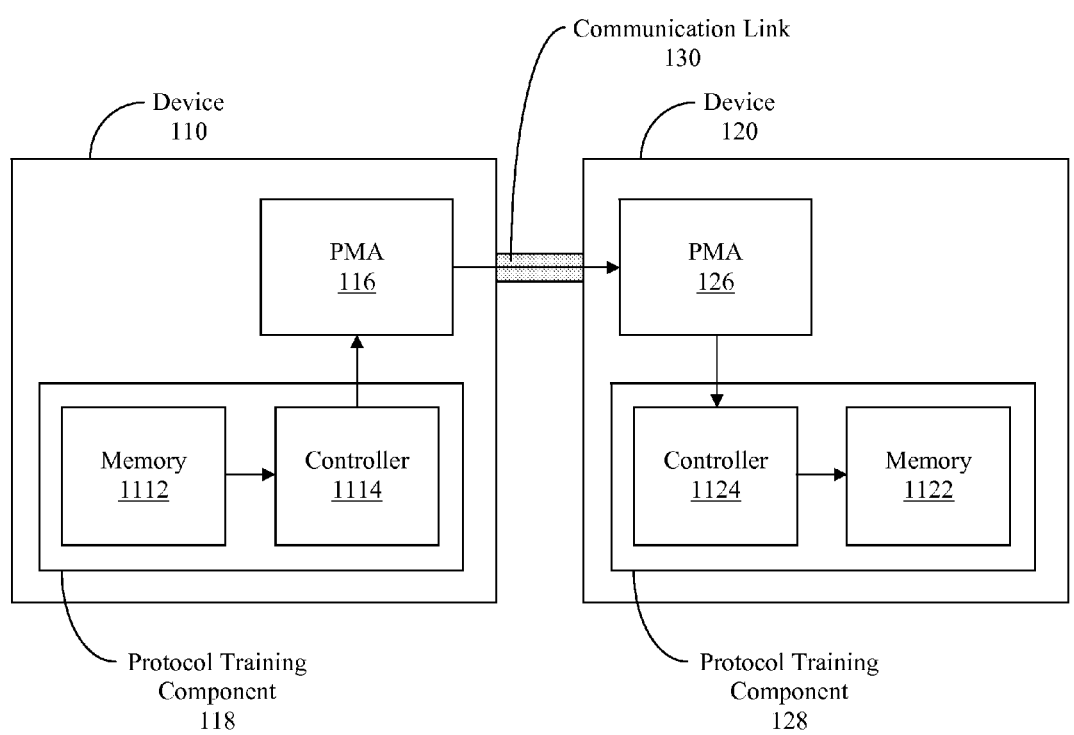
FIG. 11 shows an exemplary data flow diagram for refreshing a receiver during a low-power state in accordance with one embodiment of the present invention.

As shown in FIG. 10, step 1030 involves accessing data for refreshing the receiver of a second device (e.g., 120). In one embodiment, refreshing the receiver may include updating coefficients (e.g., communication coefficients) used by a FIR filter or another type of adaptive filter of the second device (e.g., 120) for equalization of communication link 130 and/or synchronizing a clock signal of the second device (e.g., 120) to a clock signal of the first device (e.g., 110). The data may be accessed (e.g., by controller 1114 of protocol training component 118 as shown in FIG. 11) in step 1030 from a memory (e.g., memory 1112 of protocol training component 118 as shown in FIG. 11, another memory of device 110, another memory coupled to device 110, etc.) of a protocol training component (e.g., 118) of the first device (e.g., 110), from another memory of or coupled to the first device (e.g., 110), etc. In one embodiment, the data may include at least one communication coefficient derived from a coefficient negotiation phase (e.g., during auto-negotiation performed in step 310 of FIG. 3, during an initialization protocol performed in step 320 of FIG. 3, during a previous refresh of the receiver performed similarly to step 1050, etc.) between said first and second devices. And in one embodiment, the data accessed in step 1030 may be a training frame (e.g., similar to training frame data structure 1200 of FIG. 12).

Figure 12:
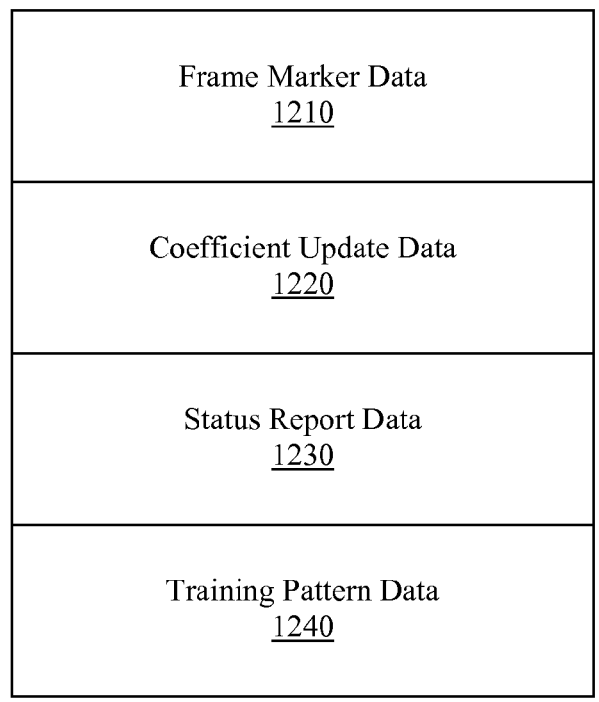
FIG. 12 shows an exemplary training frame data structure in accordance with one embodiment of the present invention.

FIG. 12 shows exemplary training frame data structure 1200 in accordance with one embodiment of the present invention. As shown in FIG. 12, training frame data structure 1200 may include frame marker data 1210, coefficient update data 1220, status report data 1230, and training pattern data 1240. Frame marker data 1210 may act as a header or otherwise signify the start of the frame. In one embodiment, frame marker data 1210 may be a predetermined size (e.g., 4 bits).

Coefficient update data 1220 may include information for updating coefficients (e.g., communication coefficients such as adaptive filter coefficients) used by the second device (e.g., 120), where the updated coefficients may be used by a FIR filter or another type of adaptive filter of the second device (e.g., 120) for equalization of communication link 130. For example, coefficient update data 1220 may indicate whether one or more coefficients should be incremented in value, decremented in value, held at the same value, etc. In one embodiment, coefficient update data 1220 may be a predetermined size (e.g., 16 bits).

As shown in FIG. 12, status report data 1230 may include information about the status of training (e.g., complete, incomplete and should continue, etc.), the status of one or more coefficients (e.g., at a maximum value, at a minimum value, updated, not updated, etc.), etc. In one embodiment, status report data 1230 may be a predetermined size (e.g., 16 bits).

Training pattern data 1240 may include one or more training patterns for synchronizing a clock signal of the second device (e.g., 120) to a clock signal of the first device (e.g., 110). In one embodiment, coefficient update data 1220 may be a predetermined size (e.g., 512 bits).

Turning back to FIG. 10, step 1030 may involve accessing the data (e.g., of one or more training frames implemented in accordance with training frame data structure 1200) from one or more locations (e.g., at least one memory of device 110) and assembling the data (e.g., to form one or more training frames in accordance with the data structure depicted in FIG. 12). Access and/or assembly of the data in step 1030 may be performed by a controller (e.g., 1114) of a protocol training component (e.g., 118) of the first device (e.g., 110) in one embodiment.

Step 1040 may involve transmitting the data (e.g., for refreshing a receiver of the second device) from the first device (e.g., 110) to the second device (e.g., 120). The data may be transmitted as a refresh signal or communication over the communication link (e.g., 130) from a PMA (e.g., 116) of the first device (e.g., 110) to a PMA (e.g., 126) of the second device (e.g., 120) as shown in FIG. 11. In one embodiment, the PMA (e.g., 116) of the first device (e.g., 110) may access the data from a controller (e.g., 1114) of a protocol training component (e.g., 118) of the first device (e.g., 110).

As shown in FIG. 10, step 1050 involves refreshing a receiver of the second device using the data (e.g., transmitted in step 1040). In one embodiment, step 1050 may involve updating coefficients (e.g., communication coefficients) used by a FIR filter or another type of adaptive filter of the second device (e.g., 120) for equalization of communication link 130. Step 1050 may involve synchronizing a clock signal of the second device (e.g., 120) to a clock signal of the first device (e.g., 110) in one embodiment. And in one embodiment, step 1050 may involve storing the data (e.g., in memory 1122 of protocol training component 128, in another memory of device 120, in another memory coupled to device 120, etc.) for subsequent access (e.g., during or responsive to a transition from the low-power state to an active state such as in step 360 of FIG. 3, step 370 of FIG. 3, etc.), where the "refreshing" of the receiver may occur responsive to the subsequent access and use of the data in one embodiment.

In one embodiment, step 1050 may be performed by a controller (e.g., 1124) of a protocol training component (e.g., 128) of the second device (e.g., 120). The controller may access the data (e.g., transmitted in step 1040) from a PMA (e.g., 126) of the second device (e.g., 120). The controller (e.g., 1124) may store the data (e.g., in memory 1122 of protocol training component 128, in another memory of device 120, in another memory coupled to device 120, etc.) and/or use the data to configure at least one component (e.g., a FIR filter or another type of adaptive filter, a clock synchronization component, etc.) of the second device (e.g., 120).

As shown in FIG. 10, step 1060 involves deactivating the transmitter of the first device (e.g., 110). In one embodiment, a protocol training component (e.g., 118) of the first device (e.g., 110) may deactivate the transmitter (e.g., the analog PHY circuitry or some portion thereof) in step 1060 (e.g., using power gating, clock gating, etc.), where the transmitter is implemented using one or more components of a PMA (e.g., 116) of the first device (e.g., 110). In this manner, the transmitter may be deactivated in step 1060 by the protocol training component (e.g., 118) while enabling other components of the first device (e.g., FEC 114, PCS 112, higher device layers, etc.) to remain deactivated to reduce power consumption in the low-power state.

Step 1070 involves deactivating the receiver of the second device (e.g., 120). In one embodiment, a protocol training component (e.g., 128) of the second device (e.g., 120) may deactivate the receiver in step 1070 (e.g., using power gating, clock gating, etc.), where the receiver is implemented using one or more components of a PMA (e.g., 126) of the second device (e.g., 120). In this manner, the receiver may be deactivated in step 1070 by the protocol training component (e.g., 128) while allowing other components of the second device (e.g., FEC 124, PCS 122, higher device layers, etc.) to remain deactivated to reduce power consumption in the low-power state.

In one embodiment, one or more of steps 1010 through 1070 may be periodically repeated to perform one or more additional refreshes of the receiver of the second device (e.g., 120) during the low-power state (e.g., as part of step 350 of FIG. 3). In this manner, embodiments of the present invention may account or compensate for changes in the properties (e.g., signal loss, noise, cross-talk, etc.) of the transmission medium (e.g., by updating coefficients used for equalization of the communication link during the low-power state) and/or for changes in the clock drift between respective clock signals of the first and second devices (e.g., by synchronizing the respective clock signals of the first and second devices during the low-power state), thereby enabling a more efficient transition from the low-power state to an active state (e.g., by avoiding or reducing the amount of coefficient re-negotiation and/or clock synchronization required during the transition, by reducing the time required to perform coefficient re-negotiation and/or clock synchronization, etc.). In one embodiment, refreshing the receiver of the second device during the low-power state may enable the rapid transition from the low-power state to the active state to occur in less than approximately 11 microseconds.

Additionally, in one embodiment, the transmission of the data (e.g., in step 1040) from the first device to the second device may serve as a heartbeat to detect link disconnects or other faults. For example, if the data (e.g., transmitted in step 1040) is not received at the second device (e.g., 120) after a predetermined time, then a fault may be signaled at the second device (e.g., 120). As another example, if a response (e.g. to the data sent in step 1040) from the second device (e.g., 120) is not received at the first device (e.g., 110) after a predetermined time, then a fault may be signaled at the first device (e.g., 110).

In one embodiment, one or more steps and/or operations in process 1000 performed at the second device (e.g., 120) may be performed responsive to a request generated at the first device (e.g., 110) and transmitted to the second device for initiating the one or more steps and/or operations. Accordingly, in this instance the first device (e.g., 110) may act as the master and the second device (e.g., 120) may act as the slave.

Transition From The Low-Power State

Figure 13:
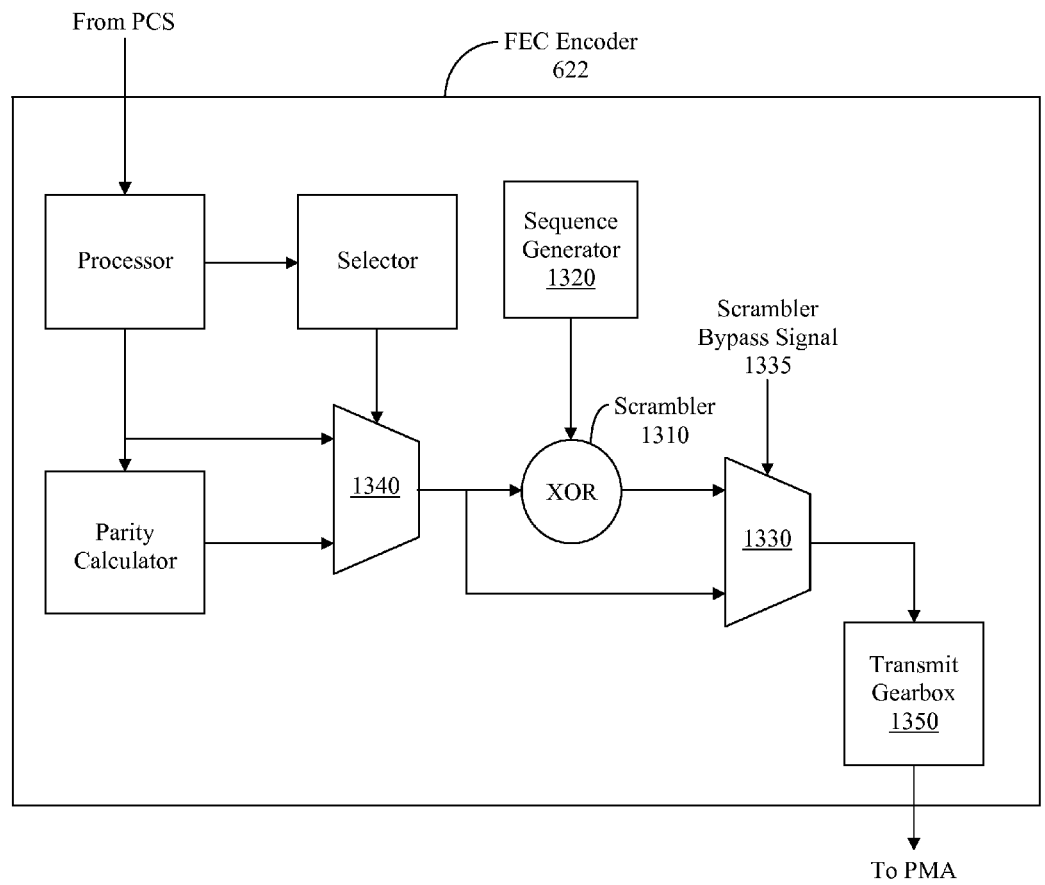
FIG. 13 shows an exemplary FEC encoder for enabling a transition from a low-power state to an active state in accordance with one embodiment of the present invention.

FIG. 13 shows exemplary FEC encoder 622 for enabling a transition from a low-power state to an active state in accordance with one embodiment of the present invention. As shown in FIG. 13, a scrambler (e.g., 1310) of a FEC (e.g., 114) of a first device (e.g., 110) may be used to scramble data received from a PCS (e.g., 112) for communication to a PMA (e.g., 116), where the scrambler (e.g., 1310) may transform the data by applying a sequence (e.g., a pseudo-random bit sequence or PRBS generated by sequence generator 1320) to the data. However, responsive to an event associated with a transition from the low-power state to an active state, scrambler 1310 may be advantageously bypassed (e.g., by asserting scrambler bypass signal 1335 to control multiplexer 1330 to bypass scrambler 1310 and communicate data from multiplexer 1340 to transmit gearbox 1350) in accordance with an embodiment of the present invention. Bypassing the scrambler (e.g., 1310) may cause the output from the FEC encoder (e.g., 622) to be a deterministic pattern that can be used by the receiver (e.g., of device 120) to more quickly identify block boundaries in the received data, e.g., establishing rapid "block lock" at the second device (e.g., 120). As such, advantageously bypassing the scrambler (e.g., 1310) may enable the transition from the low-power state to the active state (e.g., involving the activation of one or more components of the first device and/or second device to enable data to be communicated over communication link 130) to occur more quickly.

Bypassing of the scrambler (e.g., 1310) may enable the transition from the low-power state to the active state to occur within a predetermined time period (e.g., a wake time constraint imposed by the 10 GBASE-KR standard, another Ethernet standard, etc.) in one embodiment. For example, the transition may be performed within approximately 11 microseconds in one embodiment.

In one embodiment, the event triggering the transition from the low-power state to the active state may be a signal associated with data transmission over communication link 130. For example, a need or request to send data over communication link 130 (e.g., as determined by a "normal inter-frame" signal detected at the XGMII of first device 110) may trigger the transition from the low-power state to the active state. In one embodiment, the event triggering the transition from the low-power state to the active state may be the expiration of a timer associated with a period of reduced data transmission over communication link 130. For example, where the duration of the low-power state and/or a quiet state exceeds a predetermined limit, the transition from the low-power state to the active state may be automatically triggered (e.g., by the first device 110).

Figure 14:
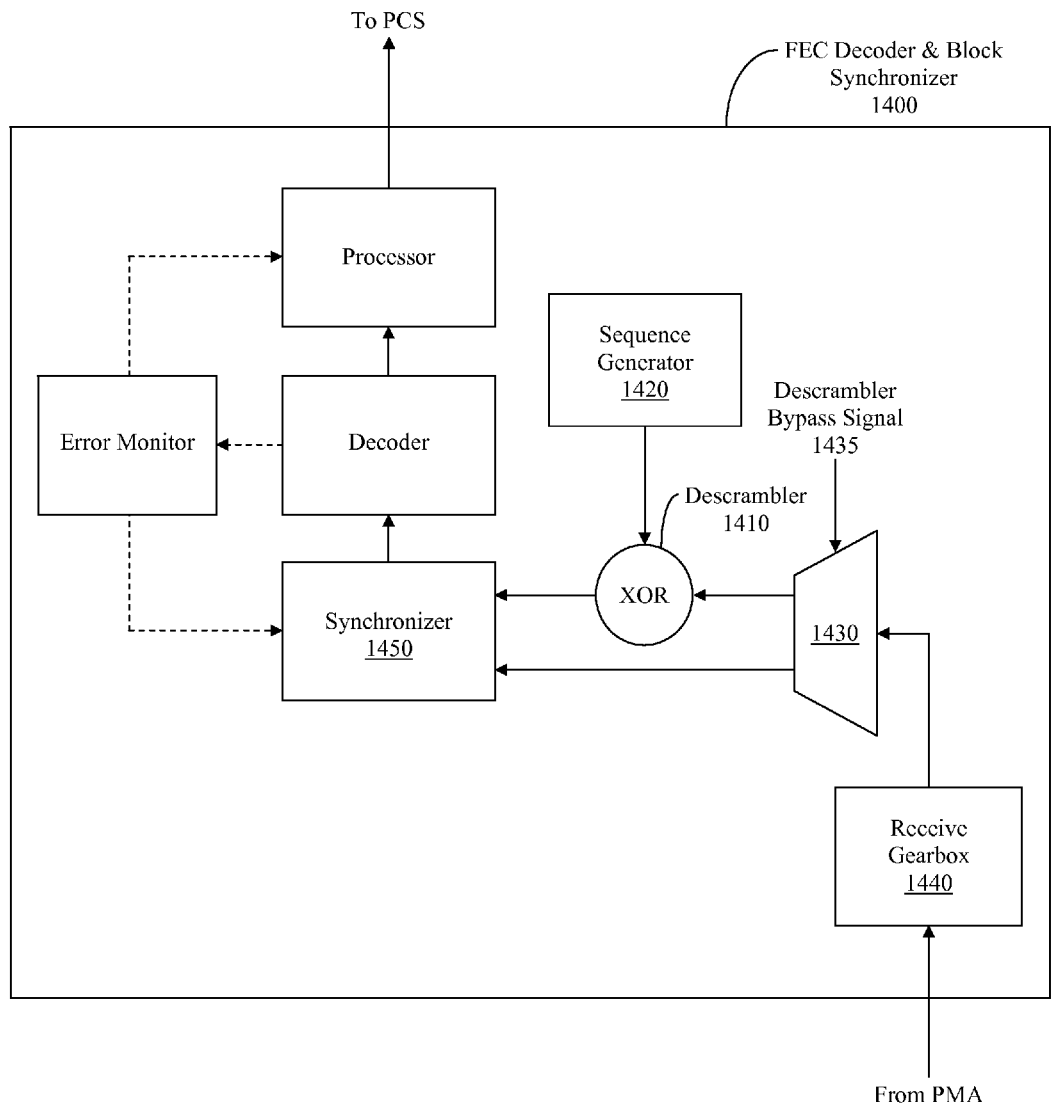
FIG. 14 shows an exemplary FEC decoder & block synchronizer for enabling a transition from a low-power state to an active state in accordance with one embodiment of the present invention.

FIG. 14 shows exemplary FEC decoder & block synchronizer 1400 for enabling a transition from a low-power state to an active state in accordance with one embodiment of the present invention. As shown in FIG. 14, a descrambler (e.g., 1410) of a FEC (e.g., 124) of a second device (e.g., 1410) may be used to descramble data received from a PMA (e.g., 126) for communication to a PCS (e.g., 122), where the descrambler (e.g., 1410) may transform the data by applying a sequence (e.g., a pseudo-random bit sequence or PRBS generated by sequence generator 1420) to the data. However, responsive to a request (e.g., generated by and communicated from the first device 110) to initiate a transition to the active state from the low-power state, descrambler 1410 may be bypassed (e.g., by asserting scrambler bypass signal 1435 to control multiplexer 1430 to bypass descrambler 1410 and communicate data from receive gearbox 1440 to synchronizer 1450). Bypassing the descrambler (e.g., 1410) may cause the output from a component of the FEC (e.g., multiplexer 1430 of FEC 124 of device 120, another component of FEC 124 of device 120, etc.) to be a deterministic pattern that can be used by the receiver (e.g., of device 120) to more quickly identify block boundaries in the received data, e.g., establishing rapid "block lock" at the second device (e.g., 120). As such, bypassing the descrambler (e.g., 1410) may enable the transition from the low-power state to the active state (e.g., involving the activation of one or more components of the first device and/or second device to enable data to be communicated over communication link 130) to occur more quickly.

Bypassing of the descrambler (e.g., 1410) may enable the transition from the low-power state to the active state to occur within a predetermined time period (e.g., a wake time constraint imposed by the 10 GBASE-KR standard, another Ethernet standard, etc.) in one embodiment. For example, the transition may be performed within approximately 11 microseconds in one embodiment.

In one embodiment, a scrambler (e.g., 1310) of the transmitter (e.g., first device 110) and a descrambler (e.g., 1410) of the receiver (e.g., second device 120) may be bypassed to accelerate block lock at the second device, thereby enabling the transition from the low-power state to the active state to occur more quickly (e.g., in less than approximately 11 microseconds). And in one embodiment, refreshing the receiver (e.g., of device 120) during the low-power state (e.g., in accordance with process 1000 of FIG. 10) in conjunction with the bypassing of a scrambler and/or the bypassing of a descrambler may enable the transition from the low-power state to the active state to occur more quickly (e.g., in less than approximately 11 microseconds).

In one embodiment, scrambler 1310 and/or sequence generator 1420 may include an additive scrambler, multiplicative scrambler, etc. Descrambler 1410 and/or sequence generator 1420 may include an additive descrambler, multiplicative descrambler, etc. And in one embodiment, sequence generator 1320 and/or sequence generator 1420 may include a linear feedback shift register (LFSR).

As shown in FIG. 13, FEC encoder 622 may include various components for processing and/or communicating data. It should be appreciated that these components of FEC encoder 622 are well known in the art, and thus, are not described in detail herein. Additionally, FEC decoder & block synchronizer 1400 may include various components for processing and/or communicating data. It should be appreciated that these components of FEC decoder & block synchronizer 1400 are well known in the art, and thus, are not described in detail herein.

Although FIGS. 13 and 14 show a specific number of components, it should be appreciated that FEC encoder 622 and/or FEC decoder & block synchronizer 1400 may include a different number of components in other embodiments. Additionally, although FIGS. 13 and 14 show a specific arrangement of components, it should be appreciated that FEC encoder 622 and/or FEC decoder & block synchronizer 1400 may include a different arrangement of components in other embodiments.

Figure 15A:
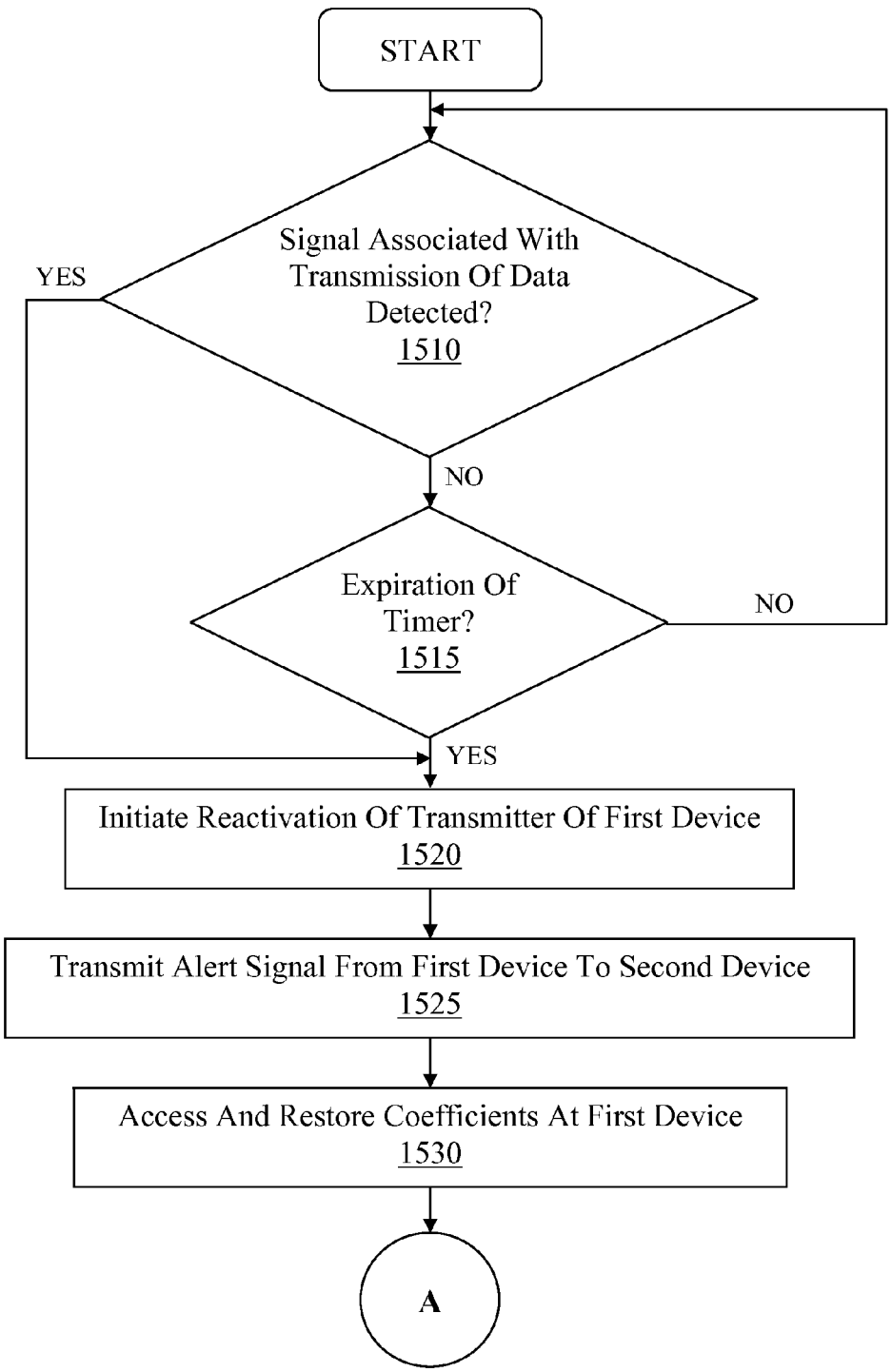
FIG. 15A shows a first portion of a flowchart of an exemplary process for transitioning from a low-power state to an active state in accordance with one embodiment of the present invention.
Figure 15B:
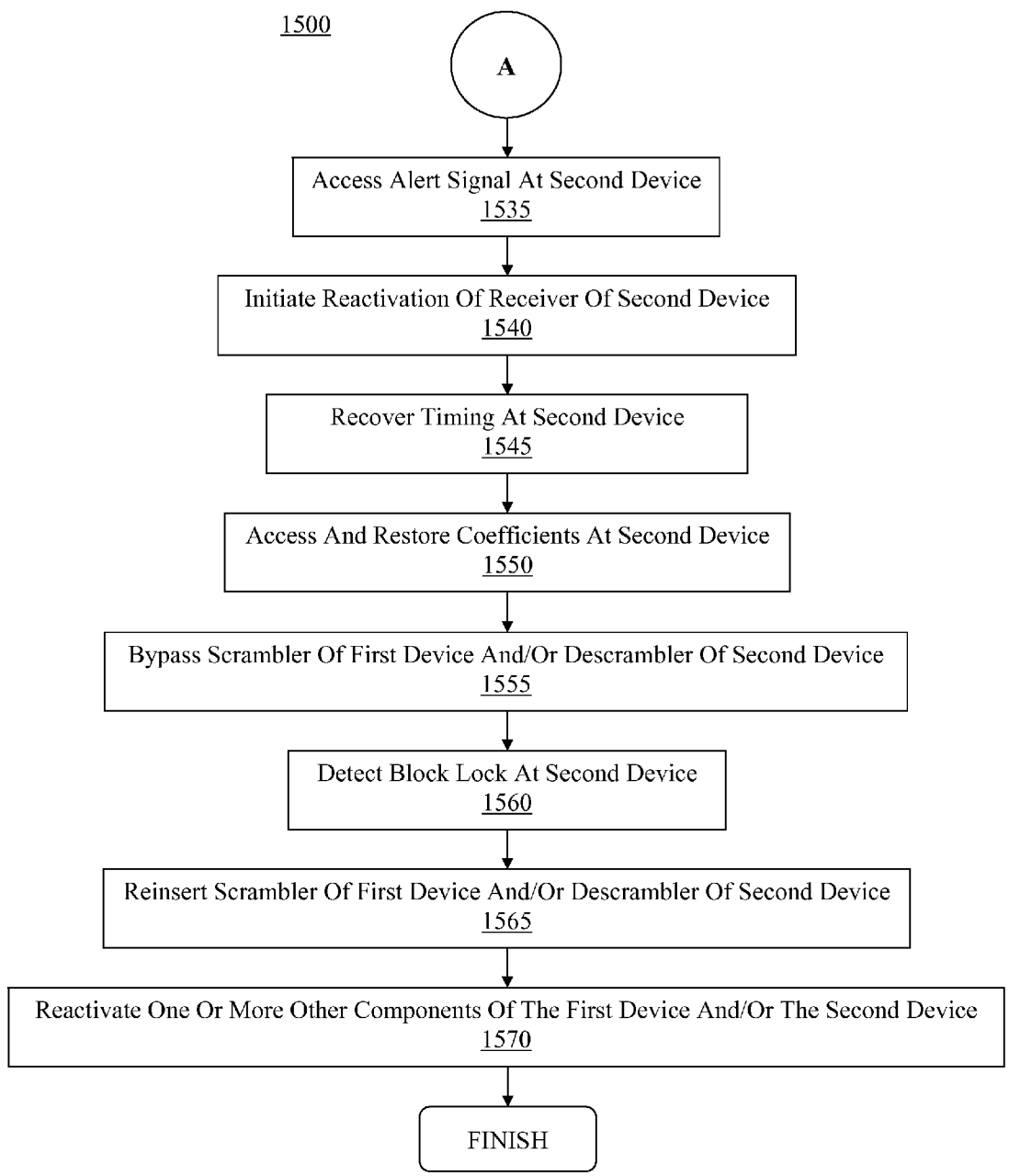
FIG. 15B shows a second portion of a flowchart of an exemplary process for transitioning from a low-power state to an active state in accordance with one embodiment of the present invention.

FIGS. 15A and 15B show a flowchart of exemplary process 1500 for transitioning from a low-power state to an active state in accordance with one embodiment of the present invention. As shown in FIG. 15A, step 1510 involves determining whether a signal associated with transmission of data is detected (e.g., at first device 110). In one embodiment, step 1510 may involve determining whether a "normal inter-frame" signal is detected at the XGMII (e.g., similar to XGMII 212) of the first device (e.g., 110). If a signal associated with transmission of data is detected in step 1510, then process 1500 may proceed to step 1520. If a signal associated with transmission of data is not detected in step 1510, then step 1515 may be performed.

Step 1515 involves determining whether a timer has expired. In one embodiment, step 1515 may involve determining whether a quiet timer (e.g., associated with a period of reduced data transmission over communication link 130 such as the low-power state, a quiet state, etc.) has expired. If it is determined in step 1515 that a timer has not expired, then step 1510 may be repeated. If it is determined in step 1515 that a timer has expired, then step 1520 may be performed.

As shown in FIG. 15A, step 1520 involves initiating a reactivation of a transmitter of the first device (e.g., 110). The transmitter (e.g., 611 of PCS 112) may be activated in step 1520 by providing power to one or more components of the transmitter, by providing a clock signal to one or more components of the transmitter, etc.

Step 1525 involves transmitting an alert signal (e.g., over communication link 130) from the first device (e.g., 110) to the second device (e.g., 120). The alert signal may be a square wave pattern with a 16 unit interval period in one embodiment.

As shown in FIG. 15A, step 1530 involves accessing and restoring coefficients at the first device (e.g., 110). In one embodiment, step 1530 may involve accessing and restoring coefficients that were stored as part of a transition from an active state to a low-power state (e.g., in step 940 of process 900 of FIG. 9). In one embodiment, the coefficients may include coefficients (e.g., communication coefficients) used by a FIR filter or another type of adaptive filter of the first device (e.g., 110) for equalization of communication link 130.

As shown in FIG. 15B, step 1535 involves accessing the alert signal (e.g., transmitted in step 1525) at the second device (e.g., 120). Responsive thereto, reactivation of the receiver of the second device may be initiated in step 1540. The receiver (e.g., 615 of PCS 122) may be activated in step 1540 by providing power to one or more components of the receiver, by providing a clock signal to one or more components of the receiver, etc.

Step 1545 involves recovering the timing at the second device (e.g., 120). In one embodiment, step 1545 may involve synchronizing a clock signal at the second device (e.g., 120) to a clock signal at the first device (e.g., 110). Timing recovery in step 1545 may be performed based on a signal sent as part of the transition from the low-power state to the active state, based on a signal sent during the low-power state (e.g., data transmitted in step 1040 of process 1000 of FIG. 10), some combination thereof, etc. In this manner, synchronization of the first device (e.g., 110) and the second device (e.g., 120) may be performed more quickly (e.g., since less or no training needs to be performed given the training and/or synchronization performed as part of the refreshing of the receiver during the low-power state), thereby enabling the transition from the low-power state to the active state to occur more quickly.

As shown in FIG. 15B, step 1550 involves accessing and restoring coefficients at the second device (e.g., 120). In one embodiment, the coefficients may include coefficients (e.g., communication coefficients) used by a FIR filter or another type of adaptive filter of the second device (e.g., 120) for equalization of communication link 130. And in one embodiment, step 1550 may involve accessing and restoring coefficients that were determined and/or stored as part of a refresh of the receiver during a low-power state (e.g., in step 1050 of process 1000 of FIG. 10). In this manner, re-negotiation of the coefficients may be avoided or reduced in step 1550, thereby enabling the transition from the low-power state to the active state to occur more quickly.

Step 1555 involves bypassing the scrambler (e.g., 1310) of the first device (e.g., 110) and/or the descrambler (e.g., 1410) of the second device (e.g., 120). For example, step 1555 may involve asserting a scrambler bypass signal (e.g., 1335) to control a multiplexer (e.g., 1330) to bypass a scrambler (e.g., 1310) of a first device (e.g., FEC encoder 622 of FEC 114 of first device 110). As another example, step 1555 may involve asserting a descrambler bypass signal (e.g., 1435) to control a multiplexer (e.g., 1430) to bypass a descrambler (e.g., 1410) of a second device (e.g., FEC decoder & block synchronizer 1400 of FEC 124 of second device 120). In one embodiment, bypass of the descrambler (e.g., 1410) in step 1555 may be performed responsive to a request, where the request may be generated at the first device (e.g., 120) and transmitted to the second device (e.g., 120) for bypassing the descrambler at the second device (e.g., 120). In one embodiment, bypass of the scrambler (e.g., 1310) and/or the descrambler (e.g., 1410) in step 1555 may cause the output of a deterministic pattern (e.g., from FEC encoder 622, a component of FEC 124 of second device 120, some combination thereof, etc.) that can be used by the receiver (e.g., of device 120) to more quickly identify block boundaries in the received data, e.g., establishing "block lock" at the second device (e.g., 120).

As shown in FIG. 15B, step 1560 involves detecting block lock at the second device (e.g., 120). In one embodiment, step 1560 may involve the identification of block boundaries in the received data by the receiver of the second device (e.g., 120) based on the deterministic pattern generated as a result of the bypassing of the scrambler (e.g., 1310) and/or the descrambler (e.g., 1410) in step 1555. In one embodiment, step 1560 may involve the transmission of a signal from the second device (e.g., 120) to the first device (e.g., 110) informing the first device of the block lock at the second device.

Step 1565 involves reinserting (e.g., in the data path of first device 110, communication link 130, second device 120, some combination thereof, etc.) the scrambler (e.g., 1310) of the first device (e.g., 110) and/or the descrambler (e.g., 1410) of the second device (e.g., 120). For example, step 1565 may involve de-asserting a scrambler bypass signal (e.g., 1335) to control a multiplexer (e.g., 1330) to access data from a scrambler (e.g., 1310) of a first device (e.g., FEC encoder 622 of FEC 114 of first device 110), thereby eliminating the bypass of the scrambler (e.g., initiated in step 1555). As another example, step 1565 may involve de-asserting a descrambler bypass signal (e.g., 1435) to control a multiplexer (e.g., 1430) to communicate data to a descrambler (e.g., 1410) of a second device (e.g., FEC decoder & block synchronizer 1400 of FEC 124 of second device 120), thereby eliminating the bypass of the descrambler (e.g., initiated in step 1555). In one embodiment, reinsertion of the descrambler (e.g., 1410) in step 1565 may be performed responsive to a request, where the request may be generated at the first device (e.g., 120) and transmitted to the second device (e.g., 120) for reinserting the descrambler at the second device (e.g., 120).

As shown in FIG. 15B, step 1570 involves reactivating one or more other components of the first device (e.g., 110) and/or second device (e.g., 120). In one embodiment, step 1570 may involve reactivating one or more components of the first device (e.g., 110) that were deactivated during the transition from an active state to the low-power state (e.g., in step 950 of process 900 of FIG. 9). In one embodiment, step 1570 may involve reactivating one or more components of the second device (e.g., 120) that were deactivated during the transition from an active state to the low-power state (e.g., in step 990 of process 900 of FIG. 9). The one or more other components may be reactivated in step 1570 by providing power to the one or more other components, by providing a clock signal to the one or more other components, etc. As such, in one embodiment, reactivation of one or more components of the first device and/or second device may enable data to be transmitted over communication link 130 in the active state.

In one embodiment, one or more steps and/or operations in process 1500 performed at the second device (e.g., 120) may be performed responsive to a request generated at the first device (e.g., 110) and transmitted to the second device for initiating the one or more steps and/or operations. Accordingly, the first device (e.g., 110) may act as the master and the second device (e.g., 120) may act as the slave.

Programmable Logic Device

Figure 16:
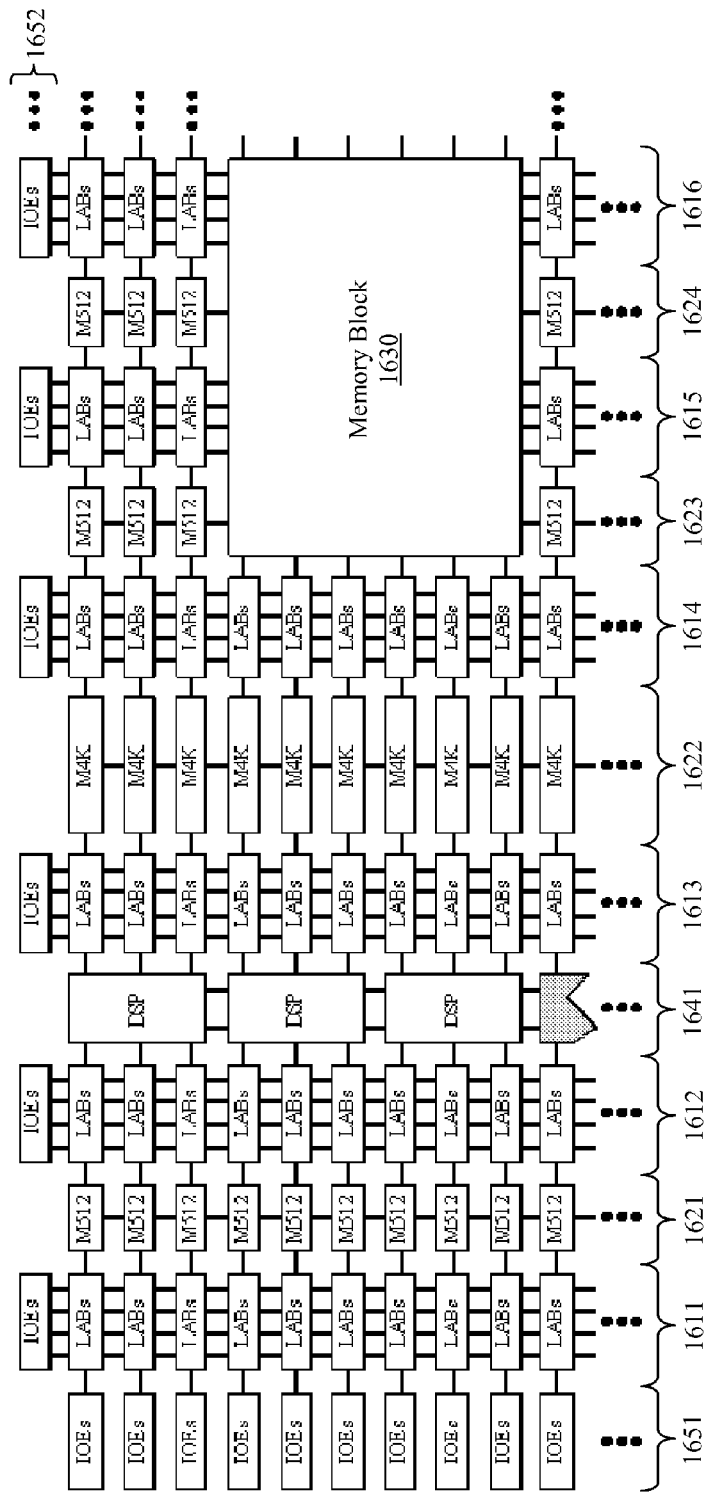
FIG. 16 shows an exemplary programmable logic device (PLD) that can be used to implement one or more aspects of the present invention.

FIG. 16 shows exemplary programmable logic device (PLD) 1600 that can be used to implement one or more components of one or more embodiments of the present invention. For instance, PLD 1600 may be used to implement a protocol training component (e.g., 118, 128, etc.), a PCS (e.g., 112, 122, etc.), a FEC (e.g., 114, 124, etc.), a PMA (e.g., 116, 126, etc.), some combination thereof, etc. PLD 1600 of FIG. 16 may be used to implement a field programmable gate array (FPGA), a complex programmable logic device (CPLD), a programmable logic arrays (PLA), or some other type of programmable logic device.

As shown in FIG. 16, PLD 1600 may include a plurality of programmable logic array blocks (LABs). The LABs of PLD 1600 may be arranged in rows and/or columns (e.g., as two-dimensional arrays) in one embodiment. For example, columns 1611, 1612, 1613, 1614, 1615 and 1616 may include one or more LABs. In one embodiment, the LABs may be interconnected by a network of column interconnect conductors and/or row interconnect conductors.

Each LAB may include logic that can be configured to implement one or more user-defined logic functions. For example, the interconnect structure of a LAB may be programmed to interconnect the components of the LAB in one or more desired configurations. A LAB may include at least one look-up table (LUT), at least one register, at least one multiplexer, some combination thereof, etc. In one embodiment, the logic may be organized into a plurality of logic elements (LEs), where the interconnection of the LEs can be programmed to vary the functionality of the LAB.

As shown in FIG. 16, PLD 1600 may include a plurality of memory blocks (e.g., memory block 1630, memory blocks in columns 1621, 1622, 1623, 1624, etc.). In one embodiment, a memory block may include random access memory (RAM), where the RAM may be used to provide dedicated true dual-port memory, simple dual-port memory, single-port memory, or some combination thereof. And in one embodiment, a memory block may include at least one shift register, at least one first-in-first-out (FIFO) buffer, at least one flip-flop, some combination thereof, etc.

The memory blocks of PLD 1600 may be arranged in rows and/or columns (e.g., as two-dimensional arrays) in one embodiment. For example, columns 1621, 1622, 1623 and 1624 may include one or more memory blocks. Alternatively, one or more memory blocks (e.g., 1630) may be located individually or in small groups (e.g., of two memory blocks, three memory blocks, etc.) in the PLD.

As shown in FIG. 16, PLD 1600 may include a plurality of digital signal processing (DSP) blocks. The DSP blocks may provide digital signal processing functions such as FIR filtering, infinite impulse response (IIR) filtering, image processing, modulation (e.g., equalization, etc.), encryption, error correction, etc. The DSP blocks may offer other functionality such as accumulation, addition/subtraction, summation, etc.

PLD 1600 may include a plurality of input/output elements (IOEs). Each IOE may include at least one input buffer and/or at least one output buffer coupled to one or more pins of the PLD, where the pins may be external terminals separate from the die of the PLD. In one embodiment, an IOE may be used to communicate input signals, output signals, supply voltages, etc. between other components of the PLD and one or more external devices (e.g., separate form the PLD). In one embodiment, the IOEs may be located at end of the rows and columns of the LABs around the periphery of PLD 1600 (e.g., in column 1651, in row 1652, etc.).

In one embodiment, PLD 1600 may include routing resources. For example, PLD 1600 may include LAB local interconnect lines, row interconnect lines (e.g., "H-type wires"), column interconnect lines (e.g., "V-type wires"), etc. that may be used to route signals between components of PLD 1600.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of efficiently transitioning a communication circuit from a low-power state, said method comprising:
   responsive to an event, activating a transmitter of a first device;
   transmitting, over a communication link, an alert signal for reception by a second device;
   bypassing a scrambler of said first device to accelerate block lock at said second device; and
   reactivating at least one component of said first device to transition from said low-power state to an active state.

2. The method of claim 1, wherein said communication link is operable to provide a communication path between said first and second devices, and wherein said alert signal is operable to initiate a reactivation of a receiver of said second device.

3. The method of claim 1, wherein said first device is a programmable logic device.

4. The method of claim 1, wherein said bypassing said scrambler is performed using a multiplexer, and wherein said bypassing enables said transition from said low-power state to said active state to be performed more quickly than without said bypassing.

5. The method of claim 1, wherein said scrambler is implemented in an encoder of a forward error correction sublayer of said first device.

6. The method of claim 1 further comprising:
   responsive to detecting block lock at said second device, reinserting said scrambler in a data path of said first device.

7. The method of claim 1 further comprising:
   requesting bypass of a descrambler of said second device to accelerate block lock at said second device; and
   responsive to detecting block lock at said second device, requesting reinsertion of said scrambler in a data path of said second device.

8. The method of claim 1, wherein said event is selected from a group consisting of: a detection of a signal associated with data transmission over said communication link; and an expiration of a timer associated with a period of reduced data transmission over said communication link.

9. A circuit of a first device, said circuit comprising:
   a first component operable to scramble data to be transmitted over a communication link, wherein said communication link provides a communication path between said first device and a second device; and a second component operable to bypass said first component to accelerate block lock at said second device, and wherein said second component is further operable to bypass said first component responsive to an event associated with a transition from a low-power state to an active state.

10. The circuit of claim 9, wherein said first device is a programmable logic device.

11. The circuit of claim 9, wherein said second component comprises a multiplexer.

12. The circuit of claim 9, wherein said second component is further operable to bypass said first component to enable said transition from said low-power state to said active state to be performed more quickly than without bypassing of said first component.

13. The circuit of claim 9, wherein said second component is further operable to reinsert said first component in a data path of said first device responsive to detecting block lock at said second device.

14. The circuit of claim 9 further comprising:
a third component operable to generate a sequence, and wherein said first component is further operable to utilize said sequence to scramble said data.

15. The circuit of claim 9, wherein said event is selected from a group consisting of: a detection of a signal associated with data transmission over said communication link; and an expiration of a timer associated with a period of reduced data transmission over said communication link.

16. An integrated circuit comprising:
a transmitter operable to communicate with another device over a communication link;

a data scrambler operable to scramble data to be transmitted by said transmitter; and a scrambler bypass module operable to bypass said first component to accelerate block lock at said another device, and wherein said scrambler bypass module is further operable to bypass said data scrambler responsive to an event associated with a transition from a low-power state to an active state.

17. The programmable logic device of claim 16, wherein said data scrambler is a programmable logic device.

18. The programmable logic device of claim 16, wherein said scrambler bypass module comprises a multiplexer.

19. The programmable logic device of claim 16, wherein said scrambler bypass module is further operable to bypass said data scrambler to enable said transition from said low-power state to be performed more quickly than without bypassing of said data scrambler.

20. The programmable logic device of claim 16, wherein said scrambler bypass module is further operable to reinsert said data scrambler in a data path of said first device responsive to detecting block lock at said second device.

21. The programmable logic device of claim 16, wherein said forward error correction sublayer further comprises another component operable to generate a sequence, and wherein said data scrambler is further operable to utilize said sequence to scramble said data.

22. The programmable logic device of claim 16, wherein said event is selected from a group consisting of: a detection of a signal associated with data transmission over said communication link; and an expiration of a timer associated with a period of reduced data transmission over said communication link.

* * * * *